United States Patent
Hayes et al.

(10) Patent No.: US 10,226,731 B2
(45) Date of Patent: Mar. 12, 2019

(54) XENON COLLECTION METHOD AND SYSTEM

(71) Applicant: Battelle Memorial Institute, Richland, WA (US)

(72) Inventors: James C. Hayes, Richland, WA (US); Paul H. Humble, Richland, WA (US); Mark E. Panisko, Richland, WA (US); Warren W. Harper, Richland, WA (US); Timothy L. Stewart, Pendleton, OR (US)

(73) Assignee: Battelle Memorial Institute, Richland, WA (US)

(*) Notice: Subject to any disclaimer, the term of this patent is extended or adjusted under 35 U.S.C. 154(b) by 0 days.

(21) Appl. No.: 16/012,754

(22) Filed: Jun. 19, 2018

(65) Prior Publication Data

US 2018/0333671 A1    Nov. 22, 2018

Related U.S. Application Data

(62) Division of application No. 15/256,403, filed on Sep. 2, 2016, now Pat. No. 10,005,018.

(51) Int. Cl.
*B01D 53/02* (2006.01)
*B01D 53/04* (2006.01)
(Continued)

(52) U.S. Cl.
CPC ..... *B01D 53/0438* (2013.01); *B01D 46/0036* (2013.01); *B01D 53/00* (2013.01); *B01D 53/047* (2013.01); *B01D 53/261* (2013.01); *C01B 23/0052* (2013.01); *C01B 23/0057* (2013.01); *C01B 23/0063* (2013.01);
(Continued)

(58) Field of Classification Search
CPC .......... B01D 53/0438; B01D 53/047; B01D 53/261; B01D 46/0036; B01D 2253/102; B01D 2253/104; B01D 2256/18; B01D 2257/11; B01D 2259/416; C01B 23/0052; C01B 23/0057; C01B 23/0063; C01B 2210/0015; C01B 2210/0017; C01B 2210/0037
See application file for complete search history.

(56) References Cited

U.S. PATENT DOCUMENTS 3,074,776 A * 1/1963 Ryan ............... G21C 19/307
                                                         376/300
3,967,464 A    7/1976 Cormier et al.
(Continued)

OTHER PUBLICATIONS

Auer, M. et al., "Intercomparison experiments of systems for the measurement of xenon radionuclides in the atmosphere", Applied Radiation and Isotopes 60 (2004) 863-877.
(Continued)

*Primary Examiner* — Christopher P Jones
(74) *Attorney, Agent, or Firm* — Frank Rosenberg; Derek Maughan

(57) ABSTRACT

A method and system for collecting xenon (Xe) is described. A microchannel heat exchanger is used in combination with a mechanical cooler and an absorbent. A combination of components makes up a Xe Collection Subsystem that is adapted for use in an efficient process for collecting, purifying, and measuring Xe isotopes collected from air as part of the International Monitoring System.

5 Claims, 6 Drawing Sheets

(51) Int. Cl.
*B01D 53/00* (2006.01)
*B01D 46/00* (2006.01)
*B01D 53/047* (2006.01)
*B01D 53/26* (2006.01)
*C01B 23/00* (2006.01)

(52) U.S. Cl.
CPC .. *B01D 2253/102* (2013.01); *B01D 2253/104* (2013.01); *B01D 2256/18* (2013.01); *B01D 2257/102* (2013.01); *B01D 2257/104* (2013.01); *B01D 2257/11* (2013.01); *B01D 2257/80* (2013.01); *B01D 2259/416* (2013.01); *B01D 2259/4145* (2013.01); *C01B 2210/0015* (2013.01); *C01B 2210/0017* (2013.01); *C01B 2210/0037* (2013.01); *C01B 2210/0048* (2013.01); *C01B 2210/0051* (2013.01); *C01B 2210/0062* (2013.01)

(56) References Cited

U.S. PATENT DOCUMENTS

| | | | |
|---|---|---|---|
| 6,378,333 | B1 | 4/2002 | Dray |
| 6,694,775 | B1 | 2/2004 | Higginbotham et al. |
| 6,746,515 | B2* | 6/2004 | Wegeng ............. H01M 8/2483 95/96 |
| 6,833,024 | B2* | 12/2004 | Holst ................... B01D 53/02 118/715 |
| 7,879,137 | B2* | 2/2011 | Parekh ............... G03F 7/70933 95/52 |
| 2005/0235828 | A1* | 10/2005 | Ishihara ............... B01D 53/02 95/131 |
| 2006/0107831 | A1* | 5/2006 | Karwacki, Jr. ........ B01D 53/04 95/116 |
| 2006/0260358 | A1* | 11/2006 | Kun .................... F25J 3/04242 62/643 |
| 2009/0188278 | A1* | 7/2009 | Savinov ............... C01B 23/001 62/617 |
| 2015/0099416 | A1* | 4/2015 | Albright ............ B02C 19/0068 445/61 |

OTHER PUBLICATIONS

Bowyer, T.W. et al., "Detection and analysis of xenon isotopes for the comprehensive nuclear-test-ban treaty international monitoring system" Journal of Environmental Radioactivity 59(2002) 139-151.
Fontaine, J.-P et al., "Atmospheric xenon radioactive isotope monitoring," Journal of Environmental Radioactivity 72 (2004) 129-135.
Ringbom, A. et al., "SAUNA—a system for automatic sampling, processing, and analysis of radioactive xenon", Nuclear Instruments and Methods in Physics Research A 508 (2003) 542-553.
International Search Report and Written Opinion from International Application No. PCT/US2017/040559 dated Oct. 10, 2017.

* cited by examiner

XENON COLLECTION METHOD AND SYSTEM

This application is a divisional of U.S. patent application Ser. No. 15/256,403 filed Sep. 2, 2016.

GOVERNMENT RIGHTS

This work was conducted with support from the U.S. Government under contract DE-AC05-76RL01830 awarded by the U.S. Department of Energy. The U.S. Government has certain rights in the invention.

BACKGROUND

For more than 15 years research has been conducted at Pacific Northwest National Laboratories (PNNL) and elsewhere towards developing methods to reduce the size and power of Xe collection methods. Systems incorporating Xe collection methods are known by acronyms including SPALAX™, ARSA, and SAUNA, and are described in publications such as Fontaine et al., "Atmospheric xenon radioactive isotope monitoring," Journal of Environmental Radioactivity 72 (2004) 129-135. In order for a Xe processing and measurement system to be used in the field, thus eliminating the need for a complex laboratory, there remains a need for further reductions in the size and power requirements for Xe collection systems.

INTRODUCTION

Prior Xe collection systems developed by PNNL have relied on liquid nitrogen to cool activated carbon to aid in adsorption of Xe on the adsorbent. Liquid nitrogen is difficult and expensive to use in field operations; thus, developing a system that uses a low power mechanical cooler provides a significant advantage over the prior art. In the present invention, an activated carbon adsorbent is cooled to −100° C. or less (preferably about −110° C.) using a mechanical cooler and a microchannel heat exchanger that uses the cold waste air exiting the sorbent bed to precool incoming air. By precooling the air in a recuperator, much less energy is required to cool the air to the collection temperature, resulting in a much smaller cooler than would be required if the cold air was not recuperated.

SUMMARY OF THE INVENTION

In a first aspect, the invention provides a method of collecting and concentrating Xe from air, comprising: drawing air through a filter and into an air compressor to form a compressed air stream; removing water from the compressed air stream; passing the compressed air stream through a dryer to produce a dried air stream with decreased levels of $CO_2$; passing the dried air stream through a microchannel heat exchanger/recuperator to reduce the temperature of the air stream to −90° C. or below to produce a cold, dry air stream; passing the cold, dry air stream through a cyrocooler to reduce the temperature of the stream by at least an additional −5° C. and passing the resulting stream through; a cold Xe trap where Xe is adsorbed on adsorbent in the cold trap; and wherein, after passing through the cold Xe trap, the cold, dry air becomes xenon-depleted cold, dry air stream which then passes into coolant channels of the microchannel heat exchanger/recuperator to cool the dried air stream.

In various embodiments, the invention includes one or any combination of the following features: wherein the dry, xenon-depleted air stream is used to regenerate the dryer; wherein the dryer comprises a dual column pressure swing adsorption dryer, comprising an alumina adsorbent; wherein excess dry air from the cooled, compressed air stream passes into an inlet of the air compressor; wherein the cold trap and recuperator are disposed in a vacuum can; wherein vacuum can further includes a cold head exchanger; wherein the recuperator reduces the temperature of the dried air stream in the range of −100 to −120° C.; wherein the recuperator is a multilayer device comprising alternating layers of process channels and coolant channels, wherein the height of the process channels and coolant channels are 1 mm or less; wherein the process channels and coolant channels have lengths in the range of 10 to 25 cm; wherein the microchannel recuperator has an effectiveness of about 0.92; wherein the step of passing the cold, dry air stream through a cyrocooler comprises passing the cold, dry air stream through a series of at least two cryocoolers; wherein the cold trap comprises activated carbon as the adsorbent; wherein at least 90% (or at least 95%, or at least 98%) of the compressed air stream that passes through a dryer (minus the Xe) is used to regenerate the dryer; wherein the dried air stream with decreased levels of $CO_2$ contains between one part in 10 million and one part in one hundred thousand $CO_2$ (or between one part in 5 million and one part in five hundred thousand $CO_2$).

A microchannel heat exchanger (also known as a microchannel recuperator) is a known type of device having adjacent hot and cold flow channels that have characteristic short thermal transport distances; preferably the hot and cold flow channels are interleaved and have channel heights (the stacking direction) of less than 5 mm, preferably 2 mm or less. For purposes of the present invention, the microchannel recuperator should permit high flow rates (on the order of 100 L/min) with low pressure drops.

In another aspect, the invention provides a system for collecting and concentrating Xe from air, comprising: an air filter connected to an air compressor that is connected to a water separator; an outlet of the water separator connected to a dryer; an outlet of the dryer connected to a microchannel heat exchanger/recuperator; an outlet of the microchannel heat exchanger/recuperator connected to one or more cyrocoolers; a cold trap connected to the one or more cyrocoolers; and a passageway connecting the outlet of the cold trap to coolant channels of the microchannel heat exchanger/recuperator. In various embodiments, this aspect may be further defined with any of the features mentioned above.

The invention also includes any combination or subset of the method steps described herein. The invention further includes a system that comprises the components described in the claimed methods and/or the apparatus described herein.

DETAILED DESCRIPTION OF A PREFERRED EMBODIMENT OF THE INVENTION

Figure 1:
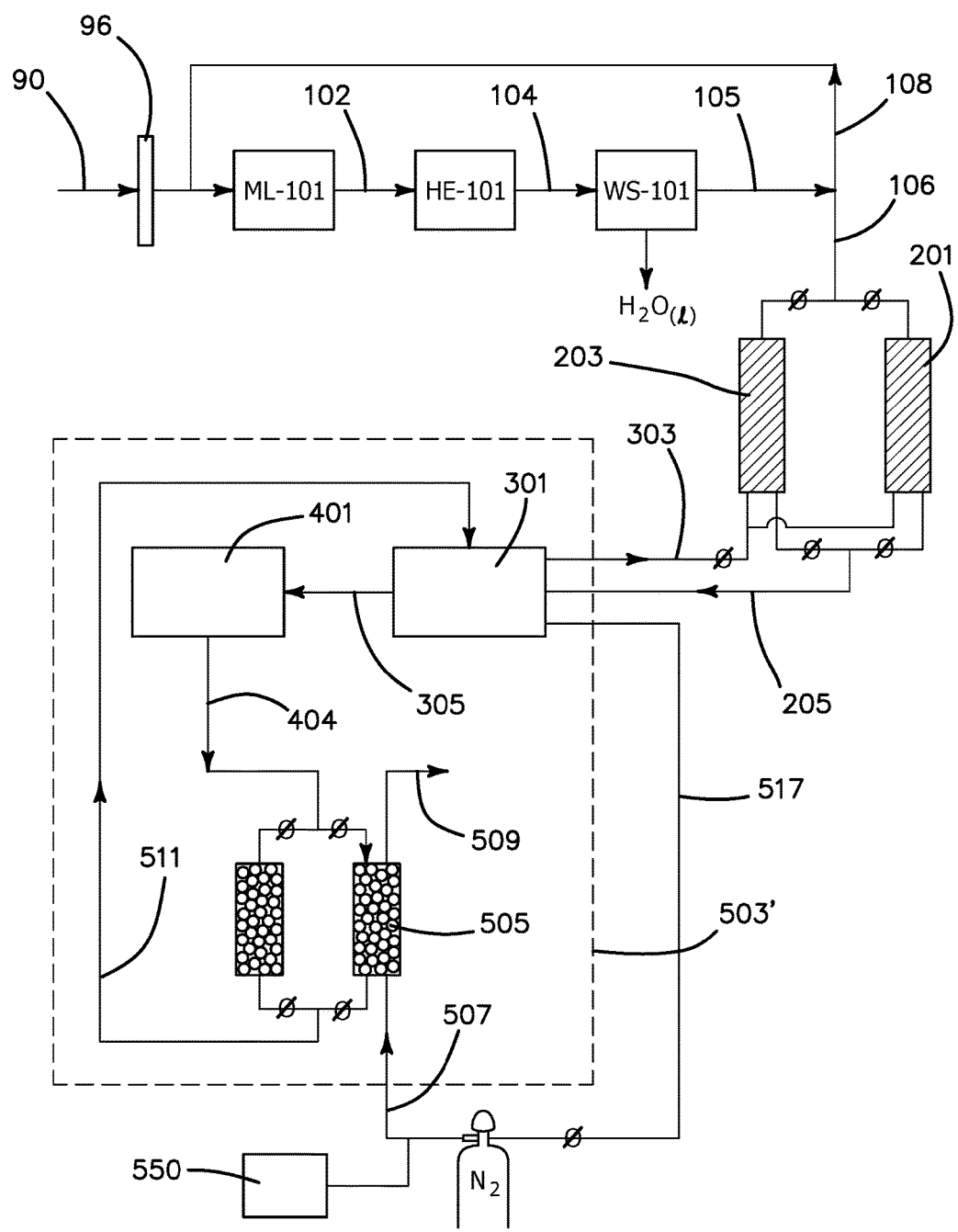
FIG. 1 is a simplified flow diagram of the Xe separation process.

The following descriptions may be better understood with reference to FIG. 1. Air 90 is taken in through a 5 μm filter 96 by air compressor ML-101. The output from air compressor ML-101 is typically 100 up to 170 standard liters per minute (SLPM, 273K) at a pressure of 6.9 bar monitored by transducer 102. The heated air from the compressor passes to heat exchanger HE-101 where the air is brought back to ambient temperature and some of the water in the air stream condenses. Typically, the heat exchanger HE-101 has fins cooled by air flow from a fan. The ambient temperature air output can be monitored by transducers 104. This output stream, which contains liquid water and water saturated air, then flows into water separator WS-101 that typically contains a high surface area substrate to separate condensed water from the air stream. The saturated air stream 105 is split with a 100 SLPM stream 106 passing to dryer 201. Back pressure controller (BPC) maintains the desired pressure of 6.9 bar by allowing excess air 108 to pass back to the inlet of the air compressor, which reduces the energy load on the system by minimizing the liquid water produced by the process and allowing the compressor MC-101 to operate at the desired back pressure. Dryer 201 is typically a dual column dryer operated by pressure swing adsorption (PSA). Typically, the columns contain alumina 203 and while the process stream is dried through one column, the second alumina column is regenerated by purging with dry, Xe-free air exiting the cold collection portion of the process.

The ambient temperature dry air 205 then enters the low temperature part of the process. This portion of the process is contained in a vacuum can (503'). The vacuum along with radiation barriers (not shown) placed around the lowest temperature components reduces heat transfer from the environment and reduces radiative and conductive heat transfer between activated carbon traps and between heat exchangers. The vacuum can contains two xenon collection flow trains, one of which is collecting xenon at low temperature while the other is desorbed and regenerated at high temperature. These two process trains cycle between collection and regeneration states such that xenon is always being collected. The hardware inside the vacuum can include microchannel heat exchanger(s)/recuperators 301, cold head heat exchanger 401 and adsorbent traps 505. The ambient temperature dry air 205 flows into microchannel heat exchanger/recuperator 301 where the temperature is reduced to −90° C. or less, preferably −100° C. or less, and in some embodiments in the range of −90 to −120° C. or −100° C. to −120° C. Desirably, the microchannel heat exchanger is a multilayer device with alternating layers of process channels and coolant channels. Preferably the channel height is 1 mm or less, more preferably 0.5 mm or less and more preferably 0.25 mm or less (in some embodiments (0.2 to 0.3 mm) for high heat transfer. Desirably, channel length is maintained sufficiently short to minimize pressure drop (preferably 100 torr to 50 torr or less pressure drop, in some embodiments 5 torr to 50 torr pressure drop), and could be, for example, in the range of 10 to 25 cm in length.

The microchannel heat exchanger should have a sufficiently large number of flow channels to manage 100 SLPM flow with low pressure drop. In the microchannel heat exchanger the process air stream (205) entering the low temperature portion of the process is cooled by the cold process air stream exiting the traps (511). These two streams pass through the microchannel heat exchanger in counter flow, removing heat from the incoming stream and heating the exiting stream. The stream exiting the microchannel heat exchanger 303, now warmed to near ambient temperature passes into a regenerating dryer column 203.

An important difference between the present system and the past ARSA system is the use of microchannel heat exchanger(s) for recuperation minimizing the load on the cold head heat exchanger(s). This allows the cooling of 100 SLPM of air from ambient to −100 to −120° C. with a modest amount of cooling (20 to 40 Watts of cooling duty). This enables the use of relatively small and low energy Stirling cryocoolers and reduces the power consumption and footprint of the system. The microchannel heat exchanger has an effectiveness of 0.92 or better. Effectiveness is the ratio of the actual heat transferred divided by the maximum possible heat that could be transferred. In equation form:

$$E=Q/(C_{min}*(T_{hi}-T_{ci}))$$

E=Effectiveness
Q=Heat transferred from the hot to cold stream
$C_{min}$=Heat capacity of the stream with the lower heat capacity
$T_{hi}$=Temperature of the hot inlet stream
$T_{ci}$=Temperature of the cold inlet steam The air stream 305, now cooled to a temperature of about −100° C. passes to one or a series (preferably two) cold head heat exchangers attached to cryocoolers 401 that further cool the process stream, typically by about −10° C. The cryocooler(s) can be stirling coolers and we used two model K535 Rycor stirling coolers in series.

The cold process stream 404 then flows at a rate of 100 SLPM into activated carbon filled traps 505 that are contained within vacuum can 503'. As explained in greater detail below with reference to FIG. 2, there are preferably two microchannel heat exchangers, and two Xe traps; with 2 cryocoolers assembled in series connected to each microchannel heat exchanger; all housed within the vacuum can. The vacuum reduces heat transfer from the environment and reduces heat transfer between activated carbon traps. The cold, 100 SLPM air stream passes through one of the cylindrical activated carbon traps for a fixed time period and Xe is adsorbed on the activated carbon. Typically, the Xe is collected for 6 hours. After the collection period, the activated carbon is heated (for example up to 100° C.) and the trap is swept with a $N_2$ stream 507. The swept gas stream passes through the microchannel recuperator 301 and is cooled to ambient temperature before being routed to a separation column (509), where other gases present in the activated carbon trap, such as Ra, are separated from Xe using gas chromatography. The separated Xe in nitrogen carrier gas passes through a small activated carbon trap held at low temperature (for example, −120 C) where xenon is collected. This small trap is heated to produce a Xe sample that is expanded into a nuclear detector where the radioactive Xe isotopes are measured by known methods. After heating and purging with $N_2$, the Xe trap is regenerated, and ready to be cooled for another Xe collection cycle.

During the xenon collection phase of operation the cold, Xe-depleted gas stream 511 is passed into the coolant channels of microchannel heat exchanger/recuperator 301 where it is warmed to ambient temperature and, typically, vented into the air. Nitrogen, cooled in the recuperator 301 and the cold head heat exchanger 401 is passed through the off-line trap to precool the trap and prepare it for xenon collection.

Figure 2:
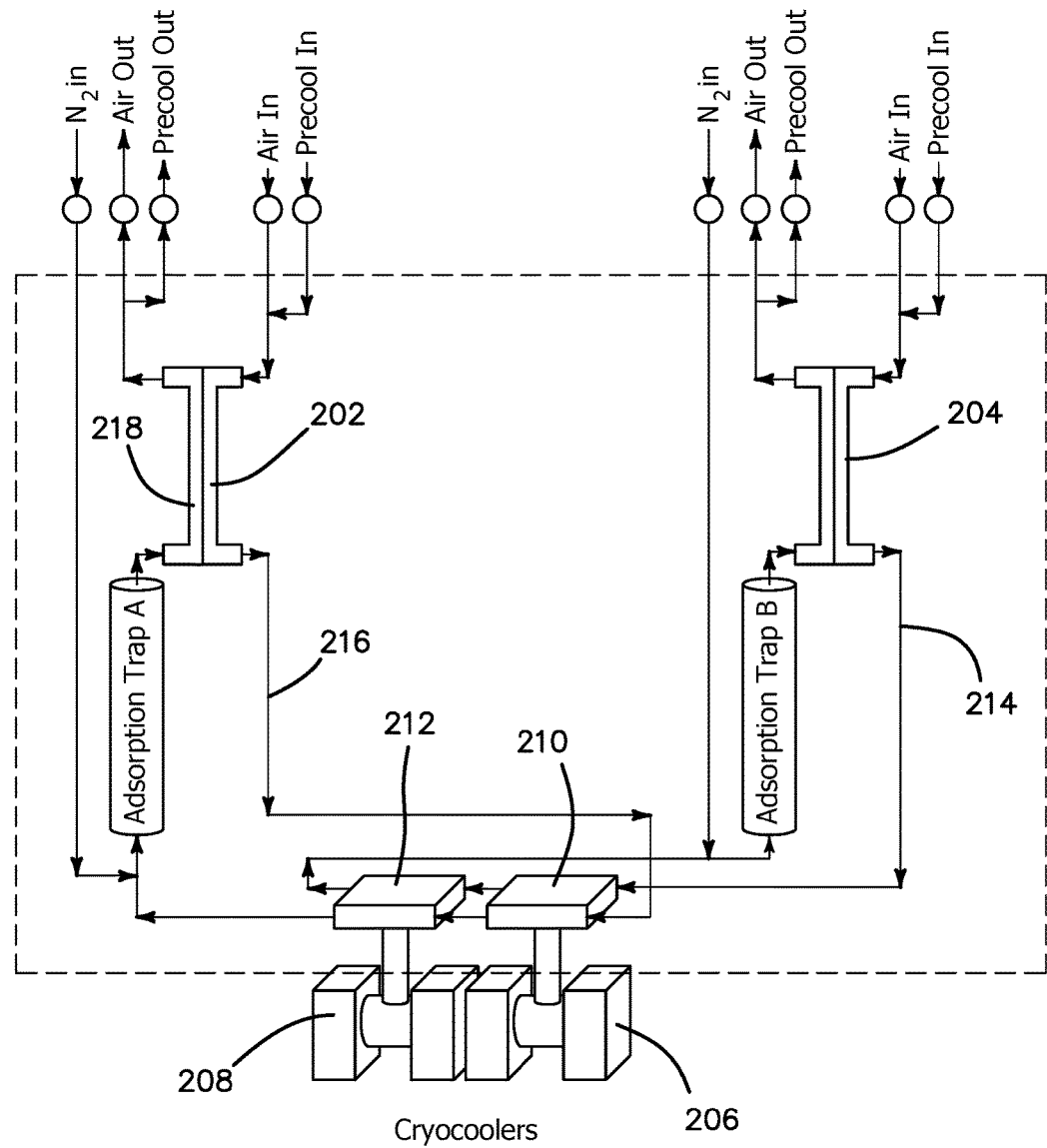
FIG. 2 is a schematic of the system disposed within the vacuum can and valves to the microchannel heat exchangers.

As shown in FIG. 2, there are two process flow trains in the vacuum can enclosure. Each flow train contains a microchannel recuperator and an activated carbon trap. Both process flow trains flow through the cold head heat exchangers (210, 212), but use separate flow passages in these devices. These separate flow trains allow for the collection of xenon on one of the activated carbon collection traps (Trap A, for example) while the second collection trap (Trap B) is desorbed, regenerated, and precooled. The precooling process requires the use of a microchannel heat exchanger and cold head heat exchanger, necessitating the use of two microchannel recuperators (Exchanger A 202 and Exchanger B 204). This configuration allows the valves (circles in FIG. 2) to be located outside of the vacuum can (indicated by dashed lines surrounding the heat exchangers and traps). In this system two cryocoolers 206, 208 are used. Each flow train 214, 216 has a separate flow path through the cold head heat exchangers. The flow paths pass through both cold head heat exchangers 210, 212 and this allows sharing of the cooling produced by the two cryocoolers. This is useful since the flow train that is collecting xenon requires more cooling than the flow train that is regenerating and precooling. Having separate flow trains with dedicated recuperative heat exchangers and separate flow paths through the cold head heat exchangers allows the valves to be located outside the vacuum can and to operate at room temperature. If the flow trains shared heat exchangers, then valves would need to be provided inside the vacuum enclose to allow switching the flow between the two adsorption traps.

The xenon-depleted air stream exiting the low temperature part of the process is used to regenerate the alumina drying columns. The very dry, $CO_2$ depleted, and Xe depleted stream exiting the main xenon trap regenerates the driers. This allows a high flowrate of clean, very dry air for regeneration. In effect, the total amount of air going through the driers (minus the Xe) is available for regeneration. This is different from the implementation used with most PSA driers, where only a fraction of the air volume dried is used for regeneration. This implementation enables better dryer performance seen as lower dew points and $CO_2$ levels.

Example

Air Intake and Compressor System
Process Flow:

The incoming air (from outside of the building) is filtered through a 5 micron compressor inlet filter (96). Following 96, we have a thermocouple and a pressure transducer to measure the input air temperature and pressure. The thermocouple and pressure transducer measure the ambient temperature and pressure inside the location where the system is installed. The incoming air is then compressed by the air compressor ML-101. ML-101 compresses the air to 7 bar. In-line with the output of the compressor is another thermocouple mounted in the air stream to measure the air compressor outlet air temperature. These three sensors can be used to monitor the health of the air compressor, as an increase in current draw, head temperature, and output air temperature could signify an impending problem with the air compressor. At the air compressor output there is also a calibration port that can be used to inject air or other gases containing a particular analyte for calibration or test purposes. For instance, a user may inject a high concentration of radon to perform a radon rejection test.

The compressed air then passes through a flow-through heat exchanger (HE-101). The purpose of the heat exchanger is to reduce the temperature of the compressed air as close to room temperature as possible and to aid in condensing out as much water from the incoming air as possible. The air at this point in the process flow contains 100% humidity. This humid air then flows through water separator WS-101, which removes a good portion of the water; however, the air at the output of the water separator still contains a high humidity level. The removed water can be evaporated or fed to a drain. The output process air from the water separator is monitored by a pressure transducer and thermocouple. After these transducers, the main process flow is split. Part of the process air provides feed to the dryer subsystem. The other part feeds back to the main input of the air compressor after its pressure is regulated by the manual back pressure control valve that is set to a value of 6.9 bar and sets the pressure into the dryer subsystem. Excess air produced by the compressor at this operating pressure is recirculated back to the input of the air compressor. This serves two main purposes: (1) to maintain a constant pressure input into the dryer subsystem so system performance does not vary and (2) to recycle the excess air. This excess air now has a lower humidity after passing through the water separator and provides a load reduction on the dryer columns.

Air Dryer System
Descriptive Overview:

The main components of the air dryer system comprise two separate columns packed with 7×12 mesh high surface area alumina spheres. The individual dryer columns operate one at a time in regard to process flow; while one is providing the function of drying the input air which is at, the other column is undergoing a back-flow of "depleted air" to regenerate the column media and ready it for the next time it is switched in as the main dryer. The term, "depleted air" refers to dry air, that has much of its $CO_2$ removed, and has passed through the main trap during a collection cycle. Further description of the "depleted air" is provided below. The dryers continually repeat this process with one being used to dry the incoming process air while the other is being regenerated. The switching time is approximately 18 minutes and is set by a timer. The Nupro valves in the dryer process flow circuit are controlled by Clippard electronic valves.

At system start-up, the state of the columns may be unknown. A quick look at the dew point sensor will indicate if the air is dry or not. A valve at the output of the dryer system can be turned on to provide a bypass to the main trap for the process air until the reading on the dew point sensor indicates that the air has been sufficiently dried by the columns. A bypass valve is only used during start-up to recycle the air to the dryers until the dew point set-point is achieved. It is not used during normal steady-state operations of the system. A typical temperature for the process stream exiting the dryer (which we measured using a thermocouple positioned along the line from the dryer to the vacuum can) during operations is approximately −95° C. The system requirement is to achieve a dew point value of at least −85° C. When the dryer process valves are turned on, the process gas flows through the dryer column to the main trap, and the depleted air back-flows through the second column as part of the regeneration process for the column. The process reverses at the end of the time interval set by a timer. In addition to removing humidity from the process air, the alumina dryer columns are efficient at removing $CO_2$.

The $CO_2$ output of the dryers is on the order of one part in $10^6$ (one ppm). In addition to the instrumentation already described in the dryer system, there are several other components that may be integral to the operation and start-up of the instrument. These include two accumulators (1000 cc) to provide startup air to the nitrogen generator and (150 cc) to provide startup air to the Clippard valves. These accumulators are filled with depleted air and have their own manual shut-off valves for isolation. During a shutdown procedure, the manual shutoff valves can be closed to trap depleted air (at working pressure) in them. During the next restart of the instrument, these valves can be opened to provide clean/dry air for the Clippard valves and the nitrogen generator until the dryer columns have dried the input process air to a sufficient level. An electronic pressure controller regulates the pressure of depleted air, and provides the air feed to the system's nitrogen generator. There are also check valves, control valves, and filters.

Process Flow:

In this example, we will assume that the valves are set such that the second column is drying the process steam and the first column is being regenerated. After the column, the air is again filtered, through a second filter, and then flows through a valve and a 1 psid (pounds per square inch differential) check valve. The check valve is installed in the process flow to prevent back flow when the main columns are switched. During operation, when one main trap is charged to 6.9 bar, the other trap operates at low pressure. This check valve prevents reverse flow when the main traps are switched. After the 1 psid check valve, a dew point sensor and a pressure sensor monitor the dew point of the process air and the pressure at the input to the main trap. At the output of the pressure transducer PT-201, the main process flow splits, with the main flow feeding the cooled activated carbon trap in collection mode and the secondary flow feeding a 150 cc accumulator and a Clippard circuit for all air operated valves on the system. The main process air then flows to one of the main traps.

At start-up, the second activated carbon trap is in collection mode first while the first activated carbon trap proceeds through the elution, regeneration, and pre-cooling phases.

Secondary Flow:

The depleted process air returning from the cold activated carbon trap that is in collection mode is returned to the dryers through a mass flow controller, which is set to 100 L/min. This depleted air then flows in the reverse direction (compared to the normal process air flow) through a valve, filter, dryer column, filter, and valve to vent. This serves to regenerate the dryer column. The returning depleted air is also split off through a valve and flows through a manual shut-off valve, ⅓ psid check valve, and into a 1000 cc accumulator. This accumulator provides clean, dry (depleted) startup air for the nitrogen generator. The return air is also split at the input to the 1000 cc accumulator and flows through the electronic pressure controller, to provide air to the nitrogen generator during normal operation. The $N_2$ generator is a separate device that provides contaminant free $N_2$ required by the system. Alternatively, stored $N_2$ could be used. Clean $N_2$ is required for elution of Xe from the activated carbon traps, and as a carrier gas to move Xe through the purification process and into the nuclear detector.

Main Trap System and Pre-Cool Recirculation Pump
Descriptive Overview:

The components of the main trap system include the two traps, which utilize an activated carbon media to collect the sample of interest. The collection trap captures oxygen, krypton, methane, xenon, and radon when it is cooled to a set-point value of −100 to −120° C. It also captures carbon dioxide that has not been removed in the dryer system. These gases adsorb onto the high specific surface area activated carbon at collection temperatures. The trap is then warmed to 40° C. to release most of the oxygen that has been adsorbed as a pre-elution State. This pre-elution State reduces the oxygen content by approximately two orders of magnitude. The trap is then heated to a temperature of 150° C. to drive the other gases off the adsorbent. A small flow of nitrogen is used to move the desorbed gases into the separation column during the elution phase. Two activated carbon traps operate at six-hour intervals. While one trap is in collection mode, the other trap proceeds through the elution/regen/pre-cool phase. The trap that is in collection mode is pressurized to approximately 6.9 bar and the flow rate through the system is set to 100 liters/min by a mass flow controller at the output of the collection trap feeding back into the dryer assembly to provide depleted air for dryer regeneration. This was set by the manual back pressure controller. The other main components include heat exchangers, referred to as "dogbones" due to their shape, and dual Ricor Stirling coolers to cool the incoming process air to the proper collection temperature and to also pre-cool the second trap that has gone through the elution/regen process.

Figure 4:
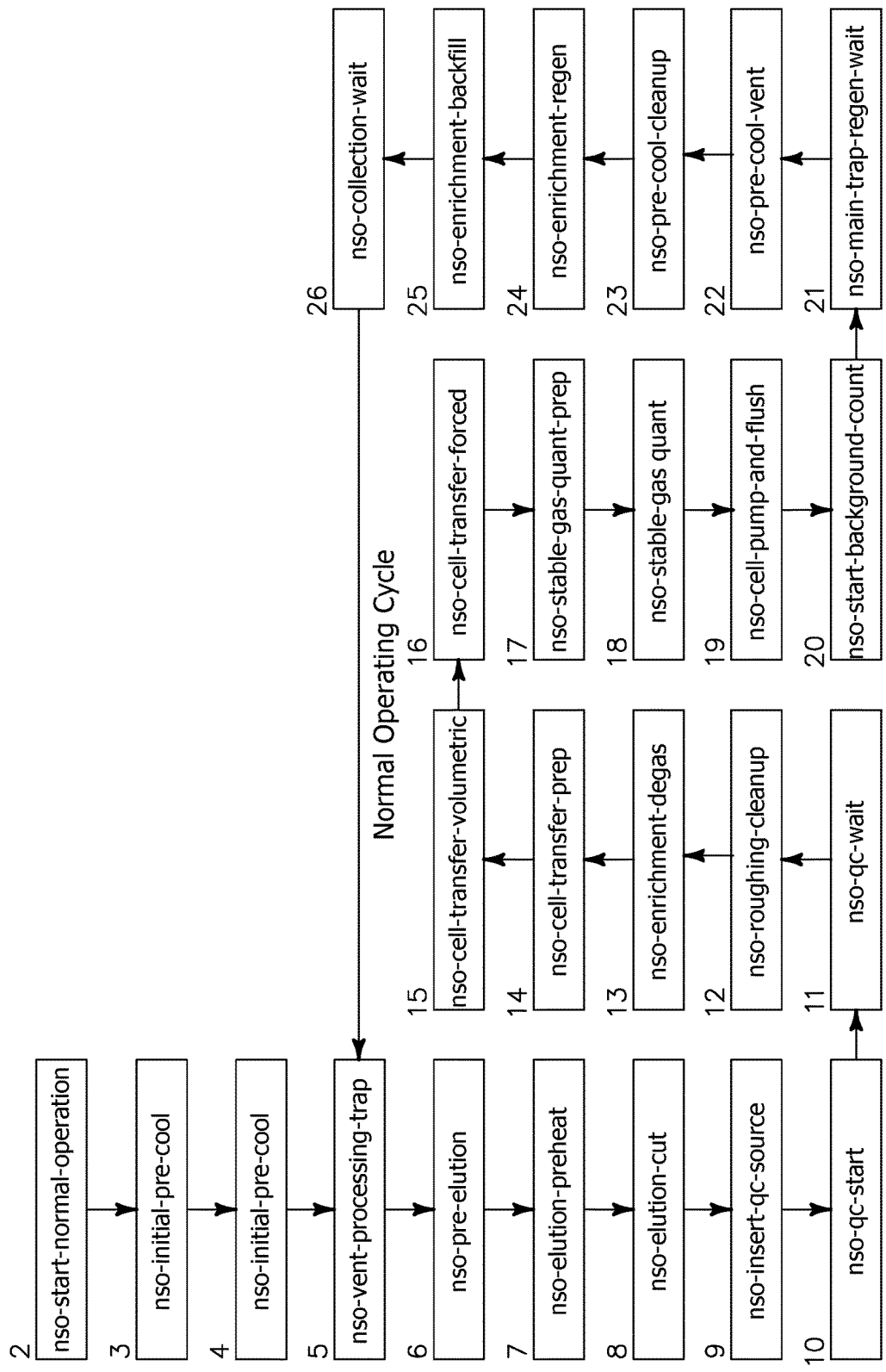
FIG. 4 is the state flow diagram for the process used by the Xe collection system.

There are also heaters to heat the trap for oxygen desorption/elution/regeneration, thermocouples to measure temperatures in the process flow, valves to control flow paths, and a vacuum can, which encloses the main components in the coldest region of the system. The pre-cool recirculation pump and associated valves and pressure controller are primarily used in the pre-cool phase of the process to circulate nitrogen through the trap that is not in collection mode but has undergone elution and regeneration. The recirculation circuit valves are turned on during the 300 second vacuum-regen portion of the initial start state to evacuate and clean up the regeneration circuit tubing. In addition, while one trap is in collection mode for six hours and the second trap is undergoing the elution/regen/pre-cool process, there are other parallel operations occurring in the instrument in regards to the separation column, enrichment trap, quantification manifold, detectors, and detector calibration system. Following the description for the process flow for all subsystems, these processes will be outlined separately in relation to what happens during each State that the system progresses through. These states are shown in FIG. 4.

Process Flow:

The process flow for the main trap can be broken down into two separate functions:

1. Collection on one trap;
2. Elution, regeneration, and pre-cool on the second trap.

Process Flow for Collection:

During start up, the right side trap is in collection mode first. The clean/dry process air from the dryers is fed into the vacuum enclosure through a valve and then flows through a filter. It then enters one side 202 of the first dogbone microchannel heat exchanger to pre-cool the incoming air. At the exit of the heat exchanger there is a thermocouple to measure the heat exchanger output temperature. The process air then flows through the first Ricor coldhead heat exchanger where most of the coldhead cooling is performed, and then through the second Ricor coldhead heat exchanger, which performs residual cooling to reach the target set point temperature of −110° C. for collection. The process air then enters the main trap A where Xe and other gasses adsorb onto the trap media. The residual depleted process air exits the top of the main trap and flows through the other side 218 of the dogbone microchannel heat exchanger. By utilizing the outflow of cool air, the heat exchanger provides most of the cooling for the incoming process air. The depleted process air then flows through a filter and out of the vacuum enclosure through a valve. This depleted air is then fed back to the dryer column that is not being utilized for collection. This depleted air is utilized for regeneration of the dryer column, as a xenon depleted air supply for the nitrogen generator, and a compressed air supply for the Clippard valves. This collection process lasts for a total of six hours, at which point the other trap is switched in to collection mode and the first Xe cold trap undergoes the elution/regen/pre-cooling phase. The vacuum enclosure contains the main traps, dogbone microchannel heat exchangers, Ricor cold head heat exchangers, thermocouples, and heaters.

Process Flow for Elution/Regen/Pre-Cooling:

While the first Xe trap is undergoing collection, the second Xe trap will undergo elution, regeneration, and pre-cooling to ready it for the next collection phase. During the collection phase, the trap was pressurized to approximately 6.9 bar with a flow rate of 100 liter/min of process air flowing through it. Once collection is done, the pressure in the first trap is reduced. This is accomplished by venting the first Xe trap through valves for about 20 seconds to reach 1 atm of pressure. The pressure of 6.8 bar was set by the manual backpressure controller, and the flow rate of 100 Liter/min was set by a mass flow controller.

Next, the pre-elution phase is entered and nitrogen flows into the trap at a flow rate of 560 sccm from mass flow controller for 1200 seconds while the trap is heated to 40° C. with a heater attached to the outside of the activated carbon trap. Because the trap has undergone a collection state previous to this elution step, it is at a temperature of approximately −120° C. and takes approximately 650 seconds for the trap to reach 40° C. as measured by the trap heater controller. This 40° C. heating step allows oxygen to be desorbed from the trap media and vented. The nitrogen and desorbed oxygen pass through the microchannel heat exchanger and out of the vacuum enclosure to vent through valves.

Once the pre-elution time of 1200 seconds (at 40 degrees° C.) has expired, the mass flow controller is set to zero, and the temperature of the trap is raised to 150° C. for 1200 seconds for the Elution-Preheat state. It takes the trap approximately 480 seconds to rise from 40° C. to 150° C. as measured by a thermocouple placed on the trap exterior. Once this 1200 second time interval for Elution-Preheat expires, the pressure (measured by a pressure sensor) will have increased to approximately 3.5 bar. The pressure sensor is not used for control at this step; it is just monitoring the pressure of the gas coming off of the activated carbon trap during the elution-preheat State.

At the end of the 1200 second elution-preheat interval, the elution-cut is performed for a period of 2100 seconds (this elution cut time interval has been determined experimentally) with the first Xe trap temperature set to 150° C. A flow path is established through the separation column, through the small xenon enrichment trap, and then to vent. Also, at the beginning of this elution-cut State, valves are opened and the mass flow controller is set to flow nitrogen as the carrier gas at a flow rate of 400 sccm through the trap. During the elution cut, valves are configured to route the carrier gas and desorbed gasses collected on the main trap through the separation column. In the separation column the different gas species propagate through the column at different rates due to the dissimilar retention times of the individual components. After passing through the separation column the valves are configured to send the xenon peak eluting from the column into a small xenon enrichment trap. This is a small activated carbon trap that is cooled to a temperature of −170° C. using a dedicated Ricor stirling cooler. At this temperature, the enrichment trap adsorbed xenon while allowing nitrogen to pass through the trap and be vented from the system. The separation column and xenon enrichment trap will be discussed more thoroughly in their respective sections.

Once the elution-cut State is complete, the flow rate of nitrogen from the mass flow controller is increased to 1300 sccm and a valve is opened to vent this nitrogen as part of the regeneration process for the column. This increased flow rate proceeds for 60 seconds, and then a valve closes to stop the nitrogen flow through the column. This is followed by applying a vacuum to the column for 300 seconds by opening a valve. This part of the vacuum-regen process occurs during the start State. At the end of this 300 second period, a valve opens again, restoring nitrogen flow at a flow rate of 1300 sccm through the column to continue the regeneration cycle with the main trap temperature set-point at 150° C. Valve V406 remains open to vacuum for a total of 900 seconds at which point a different valve opens to vent for the remainder of the regen cycle on the first Xe trap.

The vent and vacuum port valves alternate opening and closing to evacuate any dead space, as well as gas that may have diffused down the lines (depending on which trap is being regenerated). In addition, the process of alternating between venting and applying vacuum aids in the removal of radon. The regeneration of the Xe trap proceeds through the following state transitions: insert-qc-source, qc-start, qc-wait, roughing cleanup, enrichment-degas, cell-transfer-prep, cell-transfer-volumetric, cell-transfer-forced, stable-gas-quant-prep, stable-gas-quant, cell-pump-and-flush, start-background-count, and to the end of main-trap-regen-wait. The total amount of time that the main trap is under regeneration is 7200 seconds. The main trap is operated at the elevated temperature of 150° C. for approximately 9430 seconds, which includes the elution-preheat and elution-cut time.

After the regeneration period is complete, the main trap and pre-cool recirculation loop are vented to atmosphere for 5 seconds. Once this is complete, the pre-cool-cleanup State is entered, and the vent valve is closed, trap valve is closed, trap inlet valve is opened, recirculation pump is turned on, and initially the vacuum valve is opened. This State undergoes 6 pump and flush cycles, where the system alternates between vacuum being applied to the trap and then closing the valve and opening the nitrogen feed into the recirculation loop with the electronic pressure controller set to 800 Torr. The nitrogen flush intervals last for 20 seconds each, while the vacuum intervals last for 60 seconds each, with a final pump down of 120 seconds. This represents a total time of 600 seconds before the system transitions to the enrichment-regen State. During this State, the enrichment trap is regenerated in parallel with the main trap pre-cool.

The electronic pressure controller continues to set the nitrogen pressure in the recirculation loop and through the main trap under pre-cool to 800 Torr. The electronic pressure controller introduces more nitrogen into the system as the trap cools down and the pressure drops. This addition of nitrogen continues through the entire pre-cool phase and a constant pressure of 800 Torr is maintained as the temperature drops to pre-cool temperatures. During pre-cool, there is approximately 50 liters of nitrogen uptake by the main trap. The recirculation pump continues to run and circulate nitrogen through the first Xe trap while it is pre-cooled for the 400 second enrichment-regen interval.

While the recirculation pump is running during this State, the system begins monitoring the input process gas temperature into the collection trap to maintain a temperature between the upper and lower set points. This process of monitoring the input temperature of the gas into the trap in collection mode is performed so that the Ricor cold head temperatures are maintained at the correct levels for collection to proceed on the Xe trap. The recirculation pump cycles on and off to maintain the temperature.

The next two States that the system proceeds through are the enrichment-backfill State and the collection-wait State which continue to monitor the input process gas temperature into the trap in collection mode and cycle the recirculation pump on and off as needed. The next paragraph will describe the process that occurs in regards to pre-cooling the Xe trap down to a lower temperature as we progress through these two final states.

Figure 3:
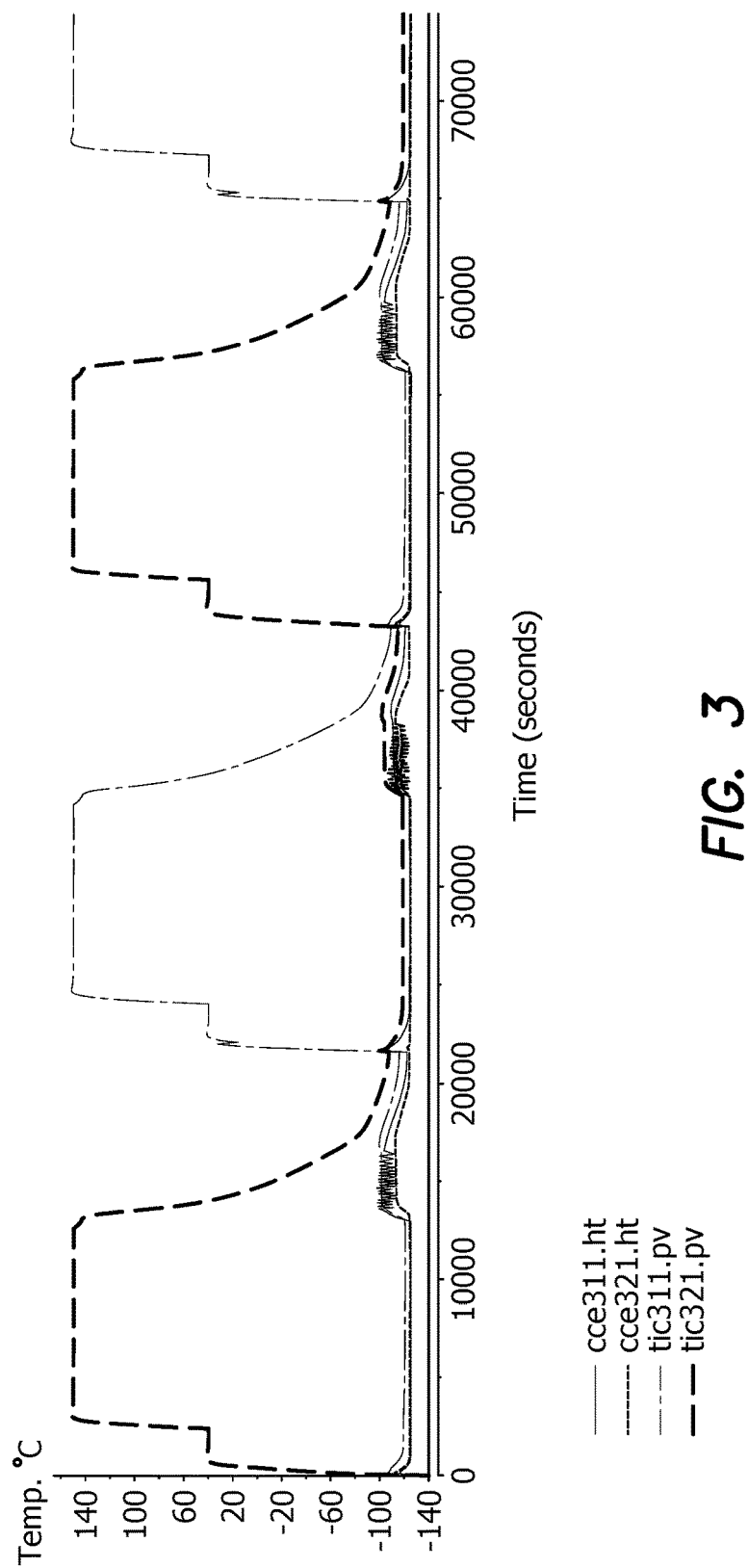
FIG. 3 is a plot of temperature as a function of time that was measured in an example of the invention.

While the recirculation pump is on, excess cold head capacity from the trap that is in collection mode is used to pre-cool the trap that is in pre-cool mode. In our example case for this process flow description, the second Xe trap is in collection mode, while the first Xe trap is undergoing the pre-cool phase. Temperature is monitored by a thermocouple to determine when to switch the recirculation pump in and out of the circuit. This thermocouple measures the process air stream before it enters the Xe trap. The process gas temperature entering the trap is monitored rather than the trap temperature itself due to the faster response of the process gas to temperature fluctuations (temperature fluctuations are shown in FIG. 3). The trap itself has a larger thermal mass and the temperature does not change as quickly. The system has parameter settings for the upper ($-107°$ C.) and lower ($-112°$ C.) limits. Once the cold head output temperature rises above the upper set point of $-107°$ C. at the thermocouple, the recirculation pump is turned off and a valve is opened to relieve head pressure on a diaphragm pump.

With the recirculation pump turned off, we are no longer rerouting cooling capacity away from the Xe trap in collection mode, and the Ricor cryogenic cooler can begin to drop the temperature to the lower set point value of $-112°$ C. This continual cycling of the recirculation pump (and its bypass valve) continues for approximately 1.7 hours, at which point the entire trap system has reduced in temperature enough such that the thermocouple never rises back up to its upper limit of $-107°$ C. The pre-cool recirculation pump cycles on and off. The temperature at the thermocouple that monitors the air going into collecting trap rises to an upper set point (about $-105$ C) with the pre-cool recirculation pump on, and then drops to the lower set point (about $-112°$ C.) when the recirculation pump is turned off.

This cycling of the recirculation pump continues for approximately 5700 seconds, at which point the upper set-point temperature is never reached again, the pump continues to run, and the process gas temperature entering the collections trap continues to drop until the end of the collection interval.

The operation of the system can be understood, in part, by reference to FIG. 3. This figure is based on data collected from operation of the system. The trace labeled tic321 shows the temperature measured on the outside surface of the second xenon trap. Heaters on the trap increase temperature first to about 40° C. and maintain this temperature to remove any $O_2$ in the trap. The trap is then heated to about 145° C. and maintained at the elevated temperature to elute Xe. The trace labeled tic311 shows the temperature measured on the outside surface of the first xenon trap which, in the initial time period, is in collection mode at a temperature of below about $-115°$ C. The trace labeled cce311 shows the temperature of $N_2$ entering the first xenon collection trap (measured after passage through the cold head heat exchangers but prior to entry of the cold trap); the section of this trace showing the oscillation is due to turning on and off the pre-cool recirculation pump. This compressor provides a low flow (about 10 SLPM) of $N_2$ through the microchannel recuperator, cold head heat exchangers and xenon trap being cooled. This compressor turns on when the air entering the collecting trap is below $-112°$ C. and turns off when this temperature climbs to $-107°$ C. This allows the removal of heat from the cooling trap while maintaining the collecting xenon trap below $-100°$ C. After the elution is complete, the temperature of the hot xenon trap is rapidly reduced by the flow of cold air from the pre-cool loop. The trace labeled cce321 shows the temperature of $N_2$ entering the second xenon collection trap. The recirculation pump in the pre-cool loop is plumbed such that it may alternately cool the first and second cold traps. After passing through a cold trap, the $N_2$ in the precool loop is warmed by passing through the microchannel heat exchanger and out of the vacuum can. The pre-cool recirculation pump is positioned outside the vacuum can. Make up $N_2$ is provided to the pre-cool loop by an electronic pressure regulator to maintain pressure as the $N_2$ cools and is adsorbed in the cooling xenon trap.

Separation Column System

Descriptive Overview:

The main components of the separation column system are a 0.5"×28" long column packed with 13× molecular sieve, a heater to bring the column up to the correct temperature for the separation process and regeneration of the column media after the elution-cut State, a fan to cool the column down after heating, input and output filters, a heater controller, thermocouples, a mass flow controller to backflow nitrogen through the column during regeneration, and input and output isolation valves.

The separation column is used for chromatography. The mixed sample that enters it is resolved into distinct peaks with stable retention times. During elution, the separation column is operated at 35° C. to provide a stable operating temperature and to shorten the retention time of the gas passing through the column. As the gas elutes off of the main trap and is carried through the separation column by the eluent (nitrogen), different components of the gas will propagate through the column media at different rates. The gas components travel through the column at a rate fundamentally determined by their physical properties, the temperature, and the particular column media (molecular sieve 13× in this case). The retention time of xenon is used to determine when to cool the enrichment trap with its Ricor stirling cooler to collection temperatures. The differing retention times of the mixed gas components will cause the individual components to come off of the column in discrete peaks of higher concentration. The peak width of the high concentration xenon peak is approximately 3 minutes wide. The peak exit time can be determined experimentally and the column output can be valved to vent unwanted gas species that are eluting from the column. Once the elution-cut State is complete, the column must be regenerated at a temperature of 175° C. before its next use. One of the last components to come off of the separation column is radon. Since radon has a longer retention time than the other gas components introduced to the column, radon is adsorbed primarily toward the input side of the column. During regeneration, nitrogen is back-flushed through the column from the output to the input where nitrogen and the unwanted analyte can be expelled through vent or vacuum. The regeneration process for the separation column occurs in parallel with regeneration of the main trap.

Process Flow During Main Trap Elution:

When the system transitions to the pre-elution State, the heater on the separation column is set to 35° C. and valves are closed to isolate the column. The separation column remains at this temperature and the column remains isolated until the elution-cut State is reached. During the elution-cut State, the process gas being eluted from the main trap, which had been in collection mode for the previous six-hour collection period, flows through the separation column and the enrichment trap to vent. The column remains at a temperature of 35° C. until the end of the elution-cut State when the column is regenerated.

Process Flow During Regen:

At the end of the elution-cut State, the system transitions to the insert-qc-source State (quality control state where a radioactive source is inserted to calibrate the nuclear detector). Note that "qc" means quality control. During this State transition valves are closed to isolate the xenon enrichment trap, the mass flow controller is set to a flow rate of 400 sccm, and the separation column's temperature is raised to 175° C. The separation column is back-flushed with nitrogen, from the output to the input. This back-flush lasts for 60 seconds (until the qc-start State transition), at which point the mass flow controller is set to zero, and the front of the separation column is open to vacuum while the column temperature remains at 175° C. This process of applying vacuum to the front of the separation column lasts for the entire 300 second qc-start State. At the end of this State, the system transitions to the qc-wait State and valves for $N_2$ are opened. The mass flow controller is set to back-flush nitrogen through the column to vacuum at a flowrate of 400 sccm while the column remains at a temperature of 175° C. The regeneration of the separation column proceeds through the following States: qc-wait, roughing cleanup, enrichment-degas, cell-transfer-prep, cell-transfer-volumetric, cell-transfer-forced, stable-gas-quant-prep, stable-gas-quant, cell-pump-and-flush, start-background-count, and to the end of main-trap-regen-wait.

At the end of the separation column regeneration phase, the next State the system transitions to is the pre-cool-vent State. At this State transition, the front of the separation column is valved off: the heater is turned off, and the separation column begins to cool down. The nitrogen flow through the column is set to 400 sccm until the enrichment-backfill State is reached. During the enrichment-backfill State, the mass flow controller is set to a value of zero and valves are closed to isolate the separation column and the column is cooled to ambient temperature by a cycling fan. Once the separation column drops to ambient temperature, the nitrogen pressure in the column will drop to approximately 1 atm. The separation column remains closed and the heater is turned off until the next pre-elution State is reached.

Enrichment Trap System

Descriptive Overview:

The main components of the xenon enrichment trap system include a 0.125" O.D.×3.4" (3.2 mm×8.6 cm) long column packed with activated carbon (45×60 mesh), a heater to bring the column up to the correct temperature for the elution process and regeneration of the column media after the pre-cool-cleanup State, a Ricor cryogenic cooler to cool the column to collection and de-gas temperatures, pneumatic lines that control a cold finger to connect the Ricor unit to the enrichment trap housing, a heater controller, a calibrated valve block with Burkert valves to "puff" a calibrated charge of nitrogen through the enrichment trap during the cell-transfer-forced State and also during the enrichment-regen/ enrichment-backfill States, and input and output isolation valves.

The general operation of the trap proceeds in the following manner: the xenon enrichment trap media is cooled to a set-point temperature of −170° C. to adsorb Xe exiting the separation column. The activated carbon adsorbent will preferentially capture xenon due to the temperature to which it is cooled. In addition, some trace impurities may also adsorb onto the activated carbon media. Once the entire xenon peak coming off of the separation column has been captured, the enrichment trap will be depressurized using a vacuum pump while the temperature of the enrichment trap is raised to −50° C. as part of the enrichment-degas State. This will remove nitrogen and trace impurities while retaining the xenon on the trap media. The xenon enrichment trap is then warmed to 170° C. using the enrichment trap heater to release the clean xenon during the cell-transfer-prep State. Finally, a volumetric transfer to a detector cell is performed followed by a controlled back-fill of nitrogen through the enrichment trap to bring the detector up to 760 Torr. The enrichment trap boosts the enrichment of xenon by a factor of approximately 2000.

Process Flow During Main Trap Elution and Enrichment Trap Specific States:

During the elution-cut State for the main trap, a flow path is established from the main trap, through the separation column, through the enrichment trap, and to vent. The Ricor set-point temperature is −170° C. and remains at this set-point until the qc-start state where a quality control source (radioactive source) is inserted to calibrate and check the detector. At the start state the temperature is raised to −50° C. using both the Ricor and the enrichment trap heater in preparation for the enrichment degas phase. When the enrichment trap is being cooled the cold finger is engaged connecting the Ricor's cold head with the xenon enrichment trap allowing it to cool down. This process of having the cold finger engaged with the enrichment trap lasts from the enrichment-backfill State until the next cell-transfer-prep transition. During regeneration of the enrichment trap the cold finger is not engaged with the enrichment trap, however; the set-point on the Ricor unit remains at −170° C. This temperature rise is achieved using the enrichment trap heater. At the transition to the qc-start State, the Ricor set-point is changed to −100° C. while the enrichment trap heater is simultaneously set to a temperature of −50° C. By utilizing both the Ricor and the enrichment trap heater, the set-point temperature of −50° C. can be achieved in a controlled manner with little overshoot.

This −50° C. set-point remains in place through several State transitions until the end of the enrichment-degas State.

At the beginning of the elution-cut State, a valve is opened and remains open until the transition to the insert-qc-source State, where the valves are closed to ioslate the enrichment trap.

In addition, the quantification manifold and target detector are evacuated. When the State machine transitions to the qc-start State, the temperature of the enrichment trap is raised to −50° C. as previously mentioned and the valves remain open through the qc-wait State, at which point the system transitions to the roughing-cleanup State and valves are closed to isolate the enrichment trap and the quantification manifold undergoes a series of 3 pump and flush cycles by modulating the valves. The electronic pressure controller is set to 500 Torr during this State.

During the next State, enrichment-degas, vacuum is applied for 30 seconds to the output side of the enrichment trap to remove trace impurities from the column media. The State machine then transitions to the cell-transfer-prep State where a flow path is set up from the enrichment trap to the cell (nuclear detector) scheduled for the next count. The enrichment trap heater set-point is also changed to a value of 170° C.

During the next State, cell-transfer-volumetric, the temperature of the enrichment trap remains at 170° C. and the sample is volumetrically expanded to the cell for a period of 1500 seconds while the enrichment trap comes up to temperature. The initial transfer of xenon has a concentration of approximately 100% and expands into the detector cell to approximately 230 Torr of pressure. During this volumetric expansion and the following forced transfer to the cell, a pressure sensor is constantly monitored to ensure an over-pressure condition does not occur. If one does occur, a valve is quickly opened to vent the excess pressure.

During the next State transition, cell-transfer-forced, the same flow path to the cell being loaded into is maintained and the temperature set-point of the enrichment trap heater remains at 170° C. To force the xenon trapped in the enrichment column media off, the system "puffs" nitrogen at a high pressure (5.5 bar) through the enrichment trap and into the detector cell. The goal of the "puff" at high pressure is twofold: (1) to push the xenon off of the trap media and into the detector cell and (2) to fight the competing process of xenon diffusion back through the tubing. In order to accomplish this, a valve is opened and the calibrated volume is charged to the nitrogen supply pressure of 5.5 bar. The valve V505 is then controlled to allow the high pressure nitrogen pulse to propagate through the trap media transporting xenon into the detector cell. The delay between subsequent "puffs" is set to 1 second and a total of 15 "puffs" are performed to bring the pressure up to approximately 760 Torr. When the forced transfer to cell is complete, the enrichment trap is valved off and remains isolated until the pre-cool-cleanup State transition when the enrichment trap heater set-point temperature is raised to a value of 150° C. to begin the regen process.

In parallel with these operations, a pump and flush is performed on the quantification manifold. Electronic pressure controller is set to a pressure of 500 Torr, and the system alternates between applying vacuum and nitrogen pressure to the quantification manifold by alternating valves. This process will be discussed in more detail in the following sections.

Process Flow During Regeneration:

The regeneration process for the enrichment trap begins at the pre-cool-cleanup State when the heater controller (Enrichment Trap (heater)) set-point temperature is changed to 150° C. The enrichment trap remains valved off during this State; however, when the State transitions to the enrichment-regen State, valves are opened to evacuate the enrichment trap. In addition, the valves controlling the calibrated volume of nitrogen "puffs" alternate to "puff" high pressure nitrogen through the enrichment trap to vacuum. A first valve opens for 1 second to charge the volume with nitrogen at the supply pressure of 5.5 bar and then closes while a second valve opens for approximately 10 seconds to allow the nitrogen pulse to propagate through the column media. This pump and flush operation lasts the entire 400 seconds of the enrichment-regen State.

The next State transition is to the enrichment-backfill State where the heater set-point is turned off, the enrichment trap Ricor cold finger is engaged, and the trap is cooled down. During this State, valves at the input and output of the enrichment trap are closed and 15 nitrogen "puff" cycles are executed to backfill the enrichment trap as the Ricor cools it down to collection temperatures.

Detector and Quantification System
Descriptive Overview:

The end product of the Xenon International instrument is to produce a quantified sample of xenon over a six-hour collection period. This quantification process requires two distinct data points: (1) the volume of the xenon sample extracted before and after the collection period and (2) an International Monitoring System (IMS) 2-D histogram file characterizing the different isotopes of interest in the sample collected. The quantification manifold and nuclear detectors produce these results. The quantification manifold's volume has been measured to a high precision. With a MKS-910 DUALTRANS pressure sensor mounted in this manifold, the pressure readings from the piezo and pirani sensors onboard can be utilized to determine the concentration of the bulk xenon in the sample. The instrument utilizes a concentration configuration file matched to the specific MKS-910 sensor that outlines the piezo and pirani pressure measurements produced by the sensor at several different gas concentrations and pressures. This data allows the instrument to calculate an accurate binary gas concentration value based on these two pressure measurements. This, in turn, allows the volume calculation of the bulk xenon in the sample collected. Once the bulk xenon sample volume has been quantified, it is transferred to the detector cell for characterization of the nuclear activity over a 12-hour count interval. Background counts are also performed for background subtraction and these intervals last approximately 10 hours.

Process Flow for Quantification:

The quantification section of the Xenon International system is used several times throughout the different States. It is used during the cell-transfer-volumetric State to set up a flow-path from the enrichment trap through the quantification manifold to the detector cell. If the pressure transducer in the manifold (PT-601) detects an over pressure condition, the excess gas can quickly be vented.

The initial quantification process occurs during the cell-transfer-forced State where high pressure "puffs" of nitrogen cause the xenon collected on the enrichment trap media to be transferred to the detector cell. The system also performs an initial volume estimate of the xenon in the sample using the MKS-910 mounted in the quantification manifold. This preliminary data is written to the IMS 2-D histogram file and is used if a premature exit of the full count time occurs.

When a sample count has completed and is ready to be unloaded, the stable-gas-quant-prep State performs a 30 second pump down of the quantification manifold. The system then transitions to the stable-gas-quant State where the detector cell is unloaded into the quantification manifold. A 30 second timer elapses to allow the quantification sensor to stabilize, while the gas is unloaded from the detector cell into the quantification manifold. The cell undergoes a series of three 15 second volumetric expansions into the quantification manifold followed by a pump to vacuum for 30 seconds in between each one. During the first expansion, the pressure is determined. During the second and third expansions out of the detector cell, the concentration of the xenon is determined using the piezo and pirani readings from the MKS-910 with the calibration file matched to the sensor.

This concentration data (calculated volume) is written to the IMS 2-D histogram file as the final result.

Process Flow for the Detector Cells:

The detectors are used during the following States: (1) all three QC calibration states to do a calibration run using a 0.25 µCi $^{137}$Cs source, (2) volumetric transfer to a detector cell where the xenon collected on the enrichment trap is volumetrically expanded to a detector cell, (3) the forced transfer to cell where a preliminary volume estimate of the xenon collected is made and written to the IMS 2-D histogram file, (4) a cell unload process to do a final quantification of the volume of xenon collected and counted, (5) cell-pump-and-flush where the cell that was unloaded after a count undergoes a series of three pump and flush routines and, (6) the start-background-count State where background counts are performed on the cells.

Summary of Valve and Controller Settings by State

The following State transitions show the conditions for a collection on Xe trap 2 and an elution/regen/pre-cool cycle on Xe trap 1. Furthermore, we will assume the xenon collected on the enrichment trap will be transferred to cell 2, and the sample in cell 1 will be unloaded and quantified during this sample run.

The system has several States which occur during start-up of the instrument including: (1) system-idle, (2) start-normal-operation, (3) Initial-pre-cool and, (4) initial-pre-cool. These States are not part of the process flow for a sample run and will not be discussed in the following outline. We will start with State 5, vent-processing-trap. The acronym "nso" means normal system operation. A flow diagram of the states in a normal-operating cycle is shown in FIG. 4 and the various steps are discussed below. Tables are provided with lists of valves used in the described stages.

5. Vent-Processing-Trap

This State vents the processing Xe trap 1 that was at high pressure during collection mode. The trap is vented down to 1 atm. The trap that has undergone elution/regen/pre-cool is now in collection mode.

| Device Type | ISA Tag | State/units | Description |
|---|---|---|---|
| Ricor Stirling Cooler | CCE-501 | on | Enrichment trap cooler |
| Turbo pump | MP-302 | on | Main trap vacuum |
| valve | V313 | on | Trap 1 process inlet valve |
| valve | V315 | on | Trap 1 precool outlet valve |
| valve | V316 | off | Trap 1 process outlet valve |
| valve | V323 | on | Trap 2 process inlet valve |
| valve | V326 | on | Trap 2 process outlet valve |
| valve | V401 | on | Main trap isolation valve |
| valve | V405 | on | Separation column inlet exhaust valve |
| Electronic pressure controller | PCV-301 | 0 Torr | Precool EPC Set-point |

6. Pre-Elution

The pre-elution State begins pre-elution on Xe trap 1 by raising the trap temperature to 40° C. to desorb oxygen from the trap. The separation column is also heated to its operating temperature of 35° C.

| Device Type | ISA Tag | State/units | Description |
|---|---|---|---|
| Ricor Stirling Cooler | CCE-501 | on | Enrichment trap cooler |
| Valve | V311 | on | Trap 1 carrier gas valve |
| Valve | V341 | on | Main trap carrier valve |
| Mass flow controller | FCV-302 | 560 SCCM | Main Traps - Carrier Elution flow set-point |
| Watlow EZ-Zone controller | TIC-311 | Set-point = 40° C. | Trap Primary (thermocouple - TE-221, heater H-311) |
| Watlow EZ-Zone controller | TIC-311 | on | Trap Primary (thermocouple - TE-221, heater H-311) |
| Watlow EZ-Zone controller | TIC-401 | Set-point = 35° C. | Separation Column (thermocouple TE-401, heater H-401) |
| Watlow EZ-Zone controller | TIC-401 | Set-point = 35° C. | Separation Column (thermocouple TE-401, heater H-401) |

7. Elution-Preheat

This State isolates the Xe trap and begins to heat it to the elution temperature of 150° C.

| Device Type | ISA Tag | State/units | Description |
|---|---|---|---|
| Ricor Stirling Cooler | CCE-501 | on | Enrichment trap cooler |
| Valve | V311 | off | Trap 1 carrier gas valve |
| Valve | V341 | off | Main trap carrier valve |
| Valve | V401 | off | Main trap isolation valve |
| Valve | V405 | off | Separation column inlet exhaust valve |
| Mass Flow Controller | FCV-302 | 0 SCCM | Main Traps - Carrier Elution flow set-point |
| Watlow EZ-Zone ® controller | TIC-311 | Set-point = 150° C. | Trap Primary (thermocouple - TE-221, heater H-311) |

8. Elution-Cut

During the elution-cut State a flow-path is established from Xe trap 1 through the separation column, enrichment trap, and to vent. Also, a pump and flush is performed on the quantification manifold at the same time.

| Device Type | ISA Tag | State/units | Description |
|---|---|---|---|
| Ricor Stirling Cooler | CCE-501 | on | Enrichment trap cooler |
| Vacuum pump | MP-401 | on | Separation column vacuum can pump |
| Valve | V311 | on | Trap 1 carrier gas valve |
| Valve | V341 | on | Main trap carrier valve |
| Valve | V401 | on | Main trap isolation valve |
| Valve | V402 | on | Separation column inlet valve |
| Valve | V501 | on | Enrichment trap inlet valve |
| Valve | V502 | on | Enrichment trap outlet valve |
| Valve | V503 | on | Enrichment trap outlet processing valve |
| Valve | V507 | on | Banjo enrichment exhaust valve |
| Valve | V606 | on | Detector manifold selector valve |

| Device Type | ISA Tag | State/units | Description |
|---|---|---|---|
| Mass Flow Controller | FCV-302 | 400 SCCM | Main Traps - Carrier Elution flow set-point |
| Electronic Pressure Controller | PVC-601 | 500 Torr | Detector pressure set-point |
| Valve | V610 | on | Detector/Quantification vacuum valve |
| Valve | V610 | off | Detector/Quantification vacuum valve |
| Valve | V605 | On | Quantification Manifold Pump and flush nitrogen valve |
| Valve | V605 | off | Quantification Manifold Pump and flush nitrogen valve |
| Valves | V610/V605 | On/off | This cycle of V605 and V6109 repeats a total of 12 times ending with V610 on and the quantification manifold open to vacuum. |

9. Insert-Qc-Source

This State initiates the regen process on the Xe trap 1 at 150° C. and the separation column CP-401 at 175° C. The enrichment trap is isolated and all tubing in the enrichment trap output gas circuits connecting the quantification manifold are open to vacuum. Also, the qc-source is inserted into the detector the instrument has scheduled for the next sample load.

| Device Type | ISA Tag | State/units | Description |
|---|---|---|---|
| Valve | V501 | off | Enrichment trap inlet valve |
|  | V502 | off | Enrichment trap outlet valve |
| Ricor Stirling Cooler | CCE-501 | on | Enrichment trap cooler |
| Client requested insertion of source at position 'cell2' | | | |
| Valve | V403 | on | Separation column outlet exhaust valve |
| Valve | V405 | on | Separation column inlet exhaust valve |
| Valve | V507 | off | Banjo enrichment exhaust valve |
| Digital output channel 'source' changed to OFF | | | |
| Valve | V508 | on | |
| Valve | V603 | on | |
| Valve | V607 | on | |
| Valve | V613 | on | |
| Mass Flow Controller | FCV-302 | 1300 SCCM | Main Traps - Carrier regeneration flow-rate set-point |
| Mass Flow Controller | FCV-401 | 400 SCCM | Separation column nitrogen flow-rate set-point for regeneration |
| Electronic Pressure Controller | PVC-601 | 0 Torr | Detector pressure set-point |
| Watlow EZ-Zone ® controller | TIC-401 | Set-point = 175° C. | Separation Column (thermocouple TE-401, heater H-401) |
| Moving linear slide 'srcpos' to cell2 | | | |
| Digital output channel 'source' changed to ON | | | |
| Valve | V508 | off | Banjo trap vacuum valve |
| Valve | V610 | off | Detector/Quantification vacuum valve |

10. Qc-Start

The enrichment trap is allowed to warm up to −50° C. during this State in preparation for the enrichment degas-State. The is achieved by running the enrichment trap Ricor unit at −100° C. with the cold finger engaged and the enrichment trap heater set-point at −50° C. A vacuum regen process is performed on the Xe trap for 300 seconds. In addition, this State is the entry point for calibration of the detector using the $^{137}$Cs source.

| Device Type | ISA Tag | State/units | Description |
|---|---|---|---|
| Ricor Stirling Cooler | CCE-501 | on | Enrichment trap cooler |
| Ricor Stirling Cooler | CCE-501 | set-point = −100° C. | Enrichment trap cooler |
| Valve | V311 | off | Trap 1 carrier gas valve |
| Valve | V312 | on | Trap 1 precool inlet valve |
| Valve | V315 | off | Trap 1 precool outlet valve |
| Valve | V333 | on | Precool compressor inlet valve |
| Valve | V334 | on | Precooling Bypass |
| Valve | V341 | off | Main trap carrier valve |
| Valve | V403 | off | Separation column outlet exhaust valve |
| Valve | V405 | off | Separation column inlet exhaust valve |
| Valve | V406 | on | Separation column inlet vacuum valve |
| Valve | V502 | on | Enrichment trap outlet valve |
| Valve | V603 | off | Detector cell 2 valve |
| Valve | V606 | on | Detector manifold selector valve |
| Mass Flow Controller | FCV-302 | 0 SCCM | Main Traps - Carrier set-point |
| Mass Flow Controller | FCV-401 | 0 SCCM | Separation column nitrogen flow-rate set-point |
| Watlow EZ-Zone ® controller | TIC-501 | set-point = −50° C. | Enrichment Trap degas temperature set-point (Thermocouple TE-501, heater H-501) |
| Watlow EZ-Zone ® controller | TIC-501 | on | Enrichment Trap (Thermocouple TE-501, heater H-501) |
| STOP issued on cell 2 | | | |
| START issued on cell 2 | | | |

11. Qc-Wait

During the qc-wait State, the calibration count with the $^{137}$Cs source is finished. In addition, the enrichment trap is continuing to warm up to −50° C. in preparation for the enrichment-degas State. Regeneration continues on the Xe trap and the separation column.

| Device Type | ISA Tag | State/units | Description |
|---|---|---|---|
| Ricor Stirling Cooler | CCE-501 | on | Enrichment trap cooler |
| Ricor Stirling Cooler | CCE-501 | set-point = −100° C. | Enrichment trap cooler |

-continued

| Device Type | ISA Tag | State/units | Description |
| --- | --- | --- | --- |
| Valve | V311 | on | Trap 1 carrier gas valve |
| Valve | V312 | off | Trap 1 precool inlet valve |
| Valve | V315 | on | Trap 1 precool outlet valve |
| Valve | V333 | off | Precool compressor inlet valve |
| Valve | V334 | off | Precooling Bypass |
| Valve | V341 | on | Main trap carrier valve |
| Valve | V403 | on | Separation column outlet exhaust valve |
| Mass Flow Controller | FCV-302 | 1300 SCCM | Main Traps - regeneration carrier flow-rate set-point |
| Mass Flow Controller | FCV-401 | 400 SCCM | Separation column carrier flow-rate flow-rate set-point |
| Valve | V507 | on | Banjo enrichment exhaust valve |
| Valve | V507 | off | Banjo enrichment exhaust valve |
| Valve | V613 | off | insertion/extraction Cell2 source control |

Client requested removal of source
STOP issued on cell 2
Wrote PBG format file for cell 2
Saved QC calibration file for cell 2

12. Roughing-Cleanup

During this State, the enrichment trap is continuing to warm up to −50° C. in preparation for the enrichment-degas State. The Xe trap and separation column continue regeneration. The quantification manifold undergoes 3 pump and flush cycles with a final pump down of 120 seconds. The $^{137}$Cs source is moved to its rest position to wait until the next calibration run.

| Device Type | ISA Tag | State/units | Description |
| --- | --- | --- | --- |
| Digital output channel 'source' changed to OFF | | | |
| Ricor Stirling Cooler | CCE-501 | on | Enrichment trap cooler |
| Ricor Stirling Cooler | CCE-501 | set-point = −100° C. | Enrichment trap cooler |
| Valve | V405 | on | Main Traps/Separation column exhaust vent |
| Valve | V406 | off | Separation column inlet vacuum valve |
| Valve | V502 | off | Enrichment trap outlet valve |
| Electronic Pressure Controller | PVC-601 | 500 Torr | Detector pressure set-point |
| Valve | V508 | off | Banjo trap vacuum valve |
| Valve | V605 | off | Pump and flush nitrogen valve |
| Valve | V508/V605 | on/off | This cycle of V508 and V605 repeats 5 more times |

13. Enrichment-Degas

During the enrichment-degas State, the enrichment trap has reached the set-point temperature of −50° C. Vacuum is applied to the output side of the enrichment trap for 30 seconds to remove trace impurities from the column media.

| Device Type | ISA Tag | State/units | Description |
| --- | --- | --- | --- |
| Ricor Stirling Cooler | CCE-501 | on | Enrichment trap cooler |
| Ricor Stirling Cooler | CCE-501 | set-point = −100° C. | Enrichment trap cooler |
| Valve | V502 | on | Enrichment trap outlet valve |
| Valve | V607 | on | Enrichment desorption flow path valve |
| Electronic Pressure Controller | PVC-601 | 0 Torr | Detector pressure set-point |
| Ricor Stirling Cooler | CCE-501 | on | Enrichment Trap (Thermocouple TE-501, heater H-501) |
| Ricor Stirling Cooler | CCE-501 | set-point = −170° C. | Enrichment Trap degas temperature set-point (Thermocouple TE-501, heater H-501) |

14. Cell-Transfer-Prep

During the cell-transfer-prep State (preparing the detector cell), the enrichment trap is valved off and the temperature is raised to the transfer temperature of 170° C. The cold finger is retracted so the Ricor is not cooling the enrichment trap. Valve V507 is opened, but isolated by V503 in the case of an over pressure condition, so the gas pressure can quickly be vented. The cell the system will transfer the gas to also has its isolation valve (V603) open.

| Device Type | ISA Tag | State/units | Description |
| --- | --- | --- | --- |
| Ricor Stirling Cooler | CCE-501 | on | Enrichment trap cooler |
| Valve | V503 | off | Enrichment trap outlet processing valve |
| Valve | V507 | on | Banjo enrichment exhaust valve |
| Valve | V508 | off | Banjo trap vacuum valve |
| Valve | V607 | on | Enrichment desorption flow path valve |
| Valve | V510 | off | Banjo cold finger actuator |
| Valve | V603 | on | Detector cell 2 valve |
| Watlow EZ-Zone ® controller | TIC-501 | set-point = 170° C. | Enrichment Trap elution temperature (Thermocouple TE-501, heater H-501) |

15. Cell-Transfer-Volumetric

During the volumetric transfer to the detector cell, the Ricor remains on; however, its cold finger is retracted. The flow-path to the cell is established and this State lasts a total of 1500 seconds. During the volumetric transfer the cell pressure reaches approximately 230 Torr.

| Device Type | ISA Tag | State/units | Description |
| --- | --- | --- | --- |
| Ricor Stirling Cooler | CCE-501 | on | Enrichment trap cooler |
| Valve | V502 | on | Enrichment trap outlet valve |
| Valve | V503 | off | Enrichment trap outlet processing valve |
| Valve | V507 | on | Banjo enrichment exhaust valve |
| Valve | V508 | off | Banjo trap vacuum valve |

| Device Type | ISA Tag | State/units | Description |
|---|---|---|---|
| Valve | V607 | on | Enrichment desorption flow path valve |
| Valve | V510 | off | Banjo cold finger actuator |
| Valve | V603 | on | Detector cell 2 valve |
| Watlow EZ-Zone ® controller | TIC-501 | set-point = 170° C. | Enrichment Trap elution temperature (Thermocouple TE-501, heater H-501) |

16. Cell-Transfer-Forced

During the forced transfer to the detector cell, the enrichment trap is heated to 170° C. The two nitrogen "puff" valves V505 and V506 perform a "puff" of high pressure nitrogen through the enrichment trap to push xenon into the detector cell. A total of 15 "puffs" are performed. The end-point pressure is approximately 760 Torr as measured by a pressure transducer. A preliminary estimate of the xenon sample transferred to the cell is made during this State and is reported in the resulting .pbg file. This value is used if there is a premature end to the 12 hour sample count time.

| Device Type | ISA Tag | State/units | Description |
|---|---|---|---|
| Ricor Stirling Cooler | CCE-501 | on | Enrichment trap cooler |
| Valve | V507 | off | Banjo enrichment exhaust valve |
| Valve | V505 | on | Carrier puff charging valve |
| Valve | V505 | off | Carrier puff charging valve |
| Valve | V506 | on | Carrier puff delivery valve |
| Valve | V506 | off | Carrier puff delivery valve |
| This cycle of alternating between V506 and V505 repeats for a total of 15 times ||||
| STOP issued on cell 2 ||||
| START issued on cell 2 ||||

17. Stable-Gas-Quant-Prep

During this State, the enrichment trap is isolated and the heater is turned off. The cell that received the forced transfer of sample is valved off and the count phase begins for that sample. Also, the system performs a vacuum pump down of the quantification manifold to ready it for unloading a sample that is finished counting.

| Device Type | ISA Tag | State/units | Description |
|---|---|---|---|
| Ricor Stirling Cooler | CCE-501 | on | Enrichment trap cooler |
| Valve | V502 | off | Enrichment trap outlet valve |
| Valve | V503 | off | Enrichment trap outlet processing valve |
| Valve | V506 | off | Carrier puff delivery valve |
| Valve | V508 | on | Banjo trap vacuum valve |
| Valve | V603 | off | Detector cell 2 valve |
| Valve | V606 | on | Detector manifold selector valve |
| Valve | V610 | on | Detector/Quantification vacuum valve |
| Watlow EZ-Zone ® controller | TIC-501 | set-point = 0° C. | Enrichment Trap elution temperature (Thermocouple TE-501, heater H-501) |
| Watlow EZ-Zone ® controller | TIC-501 | off | Enrichment Trap elution temperature (Thermocouple TE-501, heater H-501) |

18. Stable-Gas-Quant

During the stable-gas-quant State, the cell that is finished counting is unloaded and quantified to determine its volume. There are a series of three volumetric expansions performed during this process: (1) the first is to check pressure, (2) the second reduces the pressure more, and (3) the system uses this sample to check the concentration of the xenon that has been counted and this value is used in a calculation that is written to a .pbg file for the results. In between each expansion, there is a pump to vacuum cycle.

| Device Type | ISA Tag | State/units | Description |
|---|---|---|---|
| Ricor Stirling Cooler | CCE-501 | on | Enrichment trap cooler |
| Valve | V606 | off | Detector manifold selector valve |
| Valve | V607 | off | Enrichment desorption flow path valve |
| Valve | V503 | off | Enrichment trap outlet processing valve |
| Valve | V508 | off | Banjo trap vacuum valve |
| Valve | V601 | on | Detector cell 0 valve |
| Valve | V610 | on | Detector/Quantification vacuum valve |
| Valve | V601 | off | Detector cell 0 valve |
| Valve | V606 | on | Detector manifold selector valve |
| Valve | V606 | off | Detector manifold selector valve |
| Valve | V601 | on | Detector cell 0 valve |
| Valve | V601 | off | Detector cell 0 valve |
| Valve | V606 | on | Detector manifold selector valve |
| Valve | V606 | off | Detector manifold selector valve |
| Valve | V601 | on | Detector cell 0 valve |
| Valve | V601 | off | Detector cell 0 valve |
| Valve | V606 | on | Detector manifold selector valve |
| Valve | V606 | off | Detector manifold selector valve |
| Valve | V601 | on | Detector cell 0 valve |

19. Cell-Pump-and-Flush

During this State the system performs a series of three pump and flush actions on the detector cell that has just been emptied and quantified. The flush cycles last for 10 seconds each with 500 Torr of pressure being applied. The pump to vacuum cycles last for 45 seconds each with a final pump down of 120 seconds.

| Device Type | ISA Tag | State/units | Description |
|---|---|---|---|
| Ricor Stirling Cooler | CCE-501 | on | Enrichment trap cooler |
| Electronic Pressure Controller | PVC-601 | 500 Torr | Detector pressure set-point |
| V605 and V606 alternate for three pump and flush cycles ||||
| Valve | V606 | on | Detector manifold selector valve |

20. Start-Background-Count

The cell that previously had the pump and flush operations performed on it is now valved off and the background count starts. This step helps to calibrate the detector.

| Device Type | ISA Tag | State/units | Description |
|---|---|---|---|
| Ricor Stirling Cooler | CCE-501 | on | Enrichment trap cooler |
| Valve | V601 | off | Detector cell 0 valve |
| Valve | V606 | off | Detector manifold selector valve |
| Valve | V610 | off | Detector/Quantification vacuum valve |
| Electronic Pressure Controller | PVC-601 | 0 Torr | Detector pressure set-point |

21. Main-Trap-Regen-Wait

The system waits for the main trap regen interval time of 7200 seconds to expire. At this point, the system is ready to enter the precool phase.

| Device Type | ISA Tag | State/units | Description |
|---|---|---|---|
| Ricor Stirling Cooler | CCE-501 | on | Enrichment trap cooler |

22. Pre-Cool-Vent

To eliminate residual gas, the main trap and pre-cool recirculation loop are vented to atmosphere for 5 seconds at the end of the main trap and separation trap regen State.

| Device Type | ISA Tag | State/units | Description |
|---|---|---|---|
| Vacuum pump | MP-401 | off | Separation column vacuum can - vacuum pump enable |
| Valve | V333 | off | Precool compressor inlet valve |
| Valve | V334 | off | Precooling Bypass |
| Valve | V341 | on | Main trap carrier valve |
| Valve | V402 | on | Separation column inlet valve |
| Mass Flow Controller | FCV-302 | 0 SCCM | Main Traps - carrier flow-rate set-point |
| Watlow EZ-Zone ® controller | TIC-311 | Set-point = 0° C. | Trap Primary (thermocouple - TE-221, heater H-311) |
| Watlow EZ-Zone ® controller | TIC-311 | off | Trap Primary (thermocouple - TE-221, heater H-311) |
| Watlow EZ-Zone ® controller | TIC-401 | Set-point = 0° C. | Separation Column (thermocouple TE-401, heater H-401) |
| Watlow EZ-Zone ® controller | TIC-401 | off | Separation Column (thermocouple TE-401, heater H-401) |
| Ricor Stirling Cooler | CCE-501 | on | Enrichment trap cooler |

23. Pre-Cool-Cleanup

This State performs pre-cool cleanup of the Xe trap and the pre-cool recirculation loop. The nitrogen backfill of the separation column also begins during this State. In addition, the regeneration process for the enrichment trap begins when its temperature is raised to 150° C. The main trap and pre-cool recirculation loop undergo a total of 6 pump and flush cycles during this State. A constant pressure of 800 Torr is maintained in the Xe trap system during the flush cycle, which lasts for 20 seconds each. The pump to vacuum intervals last for 60 seconds each with a final pump down of 120 seconds.

| Device Type | ISA Tag | State/units | Description |
|---|---|---|---|
| Vacuum pump | MP-401 | on | Separation column vacuum can pump |
| Transfer pump | MP-301 | on | Recirculation compressor enable |
| Valve | V311 | off | Trap 1 carrier gas valve |
| Valve | V312 | on | Trap 1 precool inlet valve |
| Valve | V405 | off | Main Traps/Separation column exhaust vent |
| Electronic Pressure Controller | PVC-301 | 800 Torr | Recirculation loop precool EPC Set-point |
| Watlow EZ-Zone ® controller | TIC-501 | set-point = 150° C. | Enrichment Trap elution temperature (Thermocouple TE-501, heater H-501) |
| Watlow EZ-Zone ® controller | TIC-501 | on | Enrichment Trap elution temperature (Thermocouple TE-501, heater H-501) |
| Ricor Stirling Cooler | CCE-501 | on | Enrichment trap cooler |
| Valve | V406 | on | Separation column inlet vacuum valve |
| Valve | V406 | off | Separation column inlet vacuum valve |
| Valve | V335 | on | Precool recirculation loop nitrogen isolation valve |
| Valve | V335 | off | Precool recirculation loop nitrogen isolation valve |

V406 and V335 alternate for a total of 6 pump and flush cycles

24. Enrichment-Regen

During the enrichment-regen State the system maintains the temperature of the enrichment trap at 150° C. during the 400 second long regeneration period while "puffing" high pressure nitrogen through the enrichment trap to vacuum. In parallel with this operation, the pre-cool recirculation loop begins the pre-cool process of the Xe trap. In addition, the second Xe trap is still in collection mode. We also start cooling down the separation column using the fan.

| Device Type | ISA Tag | State/units | Description |
|---|---|---|---|
| Ricor Stirling Cooler | CCE-501 | on | Enrichment trap cooler |
| Transfer pump | MP-301 | off | Recirculation compressor enable |
| Valve | V334 | off | Precooling Bypass |
| Valve | V335 | on | Precool recirculation loop nitrogen isolation valve |
| Valve | V401 | off | Main trap isolation valve |
| Valve | V406 | off | Separation column inlet vacuum valve |
| Valve | V502 | on | Enrichment trap outlet valve |
| Valve | V503 | on | Enrichment trap outlet processing valve |
| Valve | V508 | on | Banjo trap vacuum valve |
| Fan | fan | on | Separation Column fan |
| Transfer pump | MP-301 | on | Recirculation compressor enable |
| Valve | V505 | on | Carrier puff charging valve |
| Valve | V505 | off | Carrier puff charging valve |

| Device Type | ISA Tag | State/units | Description |
|---|---|---|---|
| Valve | V506 | on | Carrier puff delivery valve |
| Valve | V506 | off | Carrier puff delivery valve |
| V505 and V506 alternate for the entire enrichment regen cycle to "puff" high pressure nitrogen through the enrichment trap | | | |
| Valve | V506 | on | Carrier puff delivery valve |

25. Enrichment-Backfill

During the enrichment-backfill State where the heater set-point is turned off, the enrichment trap Ricor cold finger is engaged through valve V510, and the trap is cooled down. During this State, the enrichment trap is valved off at the input and output and 15 nitrogen "puff" cycles are executed to backfill the enrichment trap with nitrogen as it cools down to collection temperatures.

| Device Type | ISA Tag | State/units | Description |
|---|---|---|---|
| Ricor Stirling Cooler | CCE-501 | on | Enrichment trap cooler |
| Fan | Fan-401 | on | Separation Column fan |
| Transfer pump | MP-301 | off | Recirculation compressor enable |
| Vacuum pump | MP-401 | off | Separation column vacuum can - vacuum pump enable |
| Valve | V403 | on | Separation column outlet exhaust valve |
| Valve | V502 | off | Enrichment trap outlet valve |
| Valve | V503 | off | Enrichment trap outlet processing valve |
| Valve | V506 | off | Carrier puff delivery valve |
| Valve | V508 | off | Banjo trap vacuum valve |
| Valve | V510 | on | Banjo cold finger actuator |
| Mass Flow Controller | FCV-401 | 0 SCCM | Separation column carrier flow-rate flow-rate set-point |
| Watlow EZ-Zone® controller | TIC-501 | set-point = 0° C. | Enrichment Trap elution temperature (Thermocouple TE-501, heater H-501) |
| Watlow EZ-Zone® controller | TIC-501 | off | Enrichment Trap elution temperature (Thermocouple TE-501, heater H-501) |
| Fan | Fan-401 | on | Separation Column fan |
| Valve | V505 | on | Carrier puff charging valve |
| Valve | V505 | off | Carrier puff charging valve |
| Valve | V506 | on | Carrier puff delivery valve |
| Valve | V506 | off | Carrier puff delivery valve |
| V505 and V506 alternate for a total of 15 "puffs" of nitrogen to backfill the enrichment trap | | | |

26. Collection-Wait

During the collection-wait State we wait for the collection interval of 21600 seconds to expire. In addition, the Xe trap is pre-cooled, and the separation column is cooled to room temperature. The enrichment column's cold finger is engaged with the set-point at 170° C.

| Device Type | ISA Tag | State/units | Description |
|---|---|---|---|
| Ricor Stirling Cooler | CCE-501 | on | Enrichment trap cooler |
| Fan | Fan-401 | off | Separation Column fan |
| Valve | V506 | off | Carrier puff delivery valve |
| Fan | Fan-401 | on | Separation Column fan |
| Transfer pump | MP-301 | on | Recirculation compressor enable |
| Wrote PBG format file for cell 2 | | | |
| Saved sample prelim histogram data for cell 2 | | | |
| Valve | V334 | on | Precooling Bypass |
| Transfer pump | MP-301 | off | Recirculation compressor enable |
| Valve | V334 | off | Precooling Bypass |
| Transfer pump | MP-301 | on | Recirculation compressor enable |
| V334 and MP301 alternate between on and off until the upper pre-cool limit of −107° C. is no longer reached with mp301 on. The recirculation pump continues to run and cool down the main trap (CP-311) until the collection wait interval expires. | | | |
| Transfer pump | MP-301 | off | Recirculation compressor enable |
| Valve | V335 | off | Precool recirculation loop nitrogen isolation valve |
| Valve | V334 | on | Precooling Bypass |
| Valve | V333 | off | Precool compressor inlet valve |
| Valve | V334 | on | Precooling Bypass |
| Valve | V312 | on | Trap 1 precool inlet valve |
| valve | V315 | on | Trap 1 precool outlet valve |

At the end of this stage, the process starts over.

Examples

An unexpected breakthrough happened when we tested a system using Ricor stirling coolers in a vacuum can with radiation shielding, and large capacity microchannel heat exchangers. Replacing the insulation with a vacuum can and radiation shielding reduced heat leaks into the system, but also reduced the thermal mass held at low temperature. This enables quicker cool down with a lower cooling duty.

Minimizing the mass of the main trap. Much of the mass of the traps is in the stainless steel tubing used to build the traps and connect the heat exchangers. This non sorbent mass in the trap was minimized by reducing wall thicknesses. This reduces the thermal mass and allows quicker cool down and temperature cycling.

Careful design of the main trap assembly to minimize heat uptake through conduction. This involved minimizing connections from the vacuum vessel to the traps, and using thin wall tubing to connect the heat exchangers and traps.

As for the heat exchanger design, this recuperator is sized to provide >92% effectiveness in a small size. This is very important since added thermal mass decreases the efficiency of the process, since the heat exchanger cycles in temperature during the process. This is the reason a conventional heat exchanger will not work for this process. Even if you achieve the desired effectiveness, the mass would be very large and increase the required cooling duty due to thermal cycling of the large heat exchanger mass.

The recuperator that is specially adapted for Xe collection in conjunction with the monitoring apparatus, has an effectiveness (92%) with a low mass (850 g) for the heat exchanger duty (270 W), and low pressure drop (<1 psi). This combination of features can only be achieved in a well-designed microchannel heat exchanger such as the one PNNL designed for Xenon International. This device has a small characteristic distance for heat transfer of 0.25 mm (or less), a short length (15.24 cm) to minimize pressure drop, while being designed to withstand internal pressures above 10.3 bar. Using the microchannel heat exchanger reduces the mass by over 7 times.

The ARSA, did not take advantage of recuperation. Due to this, the ARSA had a large cryocooler with over 10 times the cooling capacity of the RICOR Stirling coolers used in an example of the present invention. For reference, the ARSA system used a brooks Polycold PGC-150 chiller.

The microchannel heat exchanger that was developed and tested is shown in the figures. FIG. 4A illustrates a single heat exchanger subunit and FIG. 4B illustrates four of these heat exchangers are assembled together. Manifolds 55 are welded to collect gas through the heat exchanger flow paths.

Figure 5A:
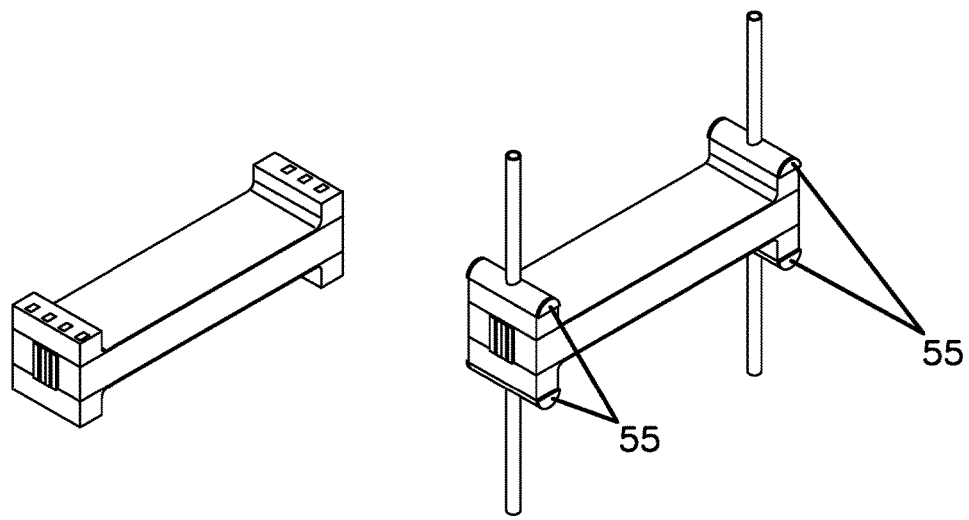
FIG. 5A shows a microchannel heat exchanger subunit used in the examples of the invention.
Figure 5B:
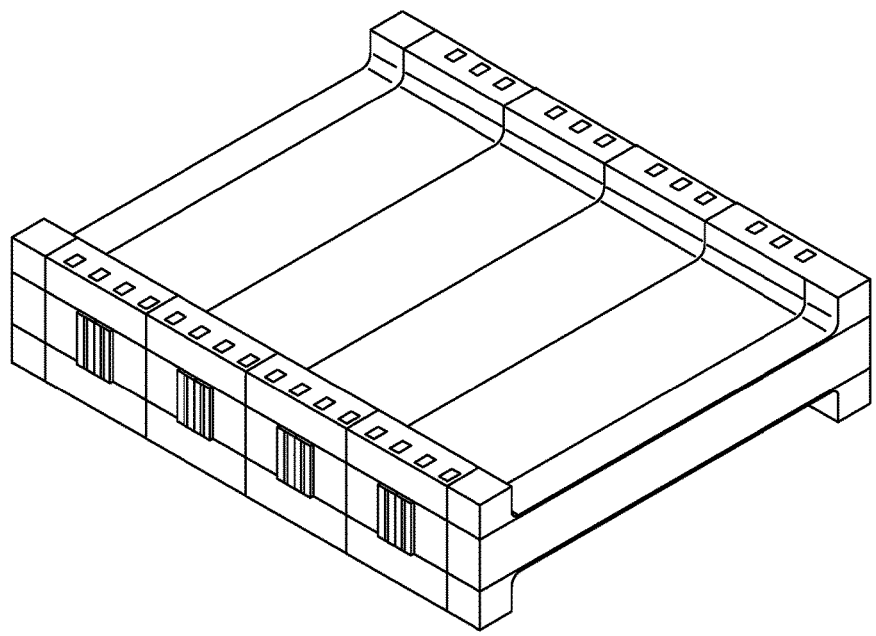
FIG. 5B shows a microchannel heat exchanger assembly made up of four subunits. This assembly was used in the examples of the invention.
Figure 6A:
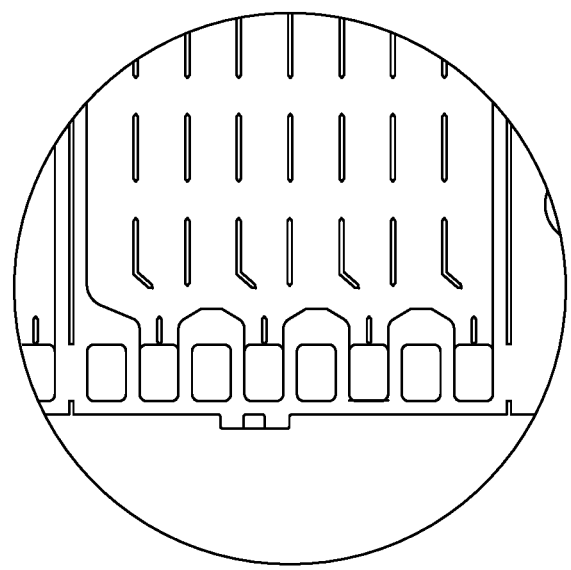
FIGS. 6A and 6B show portions of individual plates that were used to construct flow pathways through the microchannel heat exchange units used in the examples of the invention.
Figure 6B:
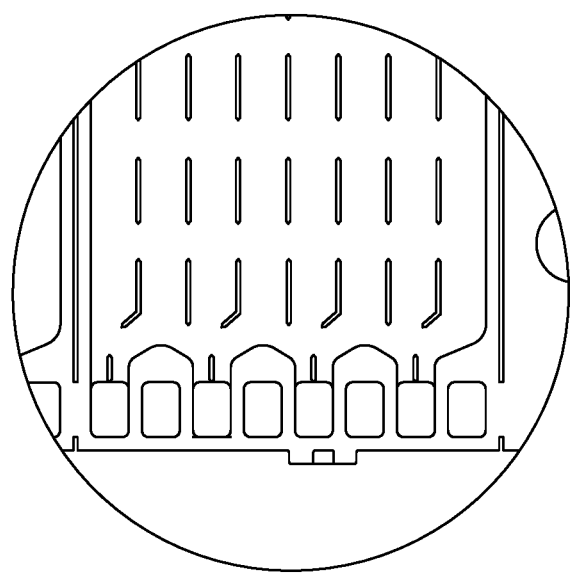

Dimensions for the hot side is shown in FIG. 5A and the cool side shown in FIG. 5B (units in English units). The shim thickness is 445 µm, and the etched channel height in the stacking direction is 178 µm±25 µm, leaving a 267 µm±25 µm wall between shims. Openings 61, 63 provide for flow to etched channels 62, 64 in alternating layers through the microchannel heat exchanger. The etched width across all the layers is 1.5 inch.

What is claimed:

1. A system for collecting and concentrating Xe from air, comprising: an air filter connected to an air compressor that is connected to a water separator; an outlet of the water separator connected to a dryer; an outlet of the dryer connected to a first microchannel heat exchanger/recuperator; an outlet of the first microchannel heat exchanger/recuperator connected to one or more cryocoolers; a first cold trap connected to the one or more cryocoolers; and a first passageway connecting the outlet of the first cold trap to coolant channels of the first microchannel heat exchanger/recuperator.

2. The system of claim 1 wherein the dryer comprises a dual column pressure swing adsorption dryer, comprising an alumina adsorbent.

3. The system of claim 1 wherein the cold trap and microchannel recuperator are disposed in a vacuum can.

4. The system of claim 1 further comprising: a second microchannel heat exchanger/recuperator and a second cold trap connected to the one or more cryocoolers; and a second passageway connecting the outlet of the second cold trap to coolant channels of the second microchannel heat exchanger/recuperator; wherein a first flow train comprises a flow path from the first microchannel heat exchanger/recuperator to the one or more cryocoolers and then to the first cold trap and then to the first microchannel heat exchanger/recuperator; wherein a second flow train comprises a flow path from the second microchannel heat exchanger/recuperator to the one or more cryocoolers and then to the second cold trap and then to the second microchannel heat exchanger/recuperator; wherein the one or more cryocoolers comprise one or more cold heads and wherein the flow trains comprise the one or more cold heads; wherein the first and second flow trains are separate flow paths; and wherein the first and second flow trains are disposed within an insulated enclosure.

5. The system of claim 4 wherein the flow through the first and second flow trains is controlled by valves outside the insulated enclosure.

* * * * *